US010699288B2

(12) United States Patent
Bemmel et al.

(10) Patent No.: US 10,699,288 B2
(45) Date of Patent: Jun. 30, 2020

(54) METHODS AND SYSTEMS FOR DISTRIBUTING INFORMATION VIA MOBILE DEVICES AND ENABLING ITS USE AT A POINT OF TRANSACTION

(71) Applicant: INMAR—YOUTECH, LLC, Winston-Salem, NC (US)

(72) Inventors: Vincent Bemmel, Dublin, CA (US); Robert Van Tuyl, Dublin, CA (US); Nhan Nguyen, Dublin, CA (US)

(73) Assignee: INMAR—YOUTECH, LLC, Winston-Salem, NC (US)

( * ) Notice: Subject to any disclaimer, the term of this patent is extended or adjusted under 35 U.S.C. 154(b) by 591 days.

(21) Appl. No.: 14/795,577

(22) Filed: Jul. 9, 2015

(65) Prior Publication Data

US 2015/0310469 A1 Oct. 29, 2015

Related U.S. Application Data

(63) Continuation of application No. 11/873,133, filed on Oct. 16, 2007, now abandoned.

(Continued)

(51) Int. Cl.
*G06Q 30/02* (2012.01)

(52) U.S. Cl.
CPC ......... *G06Q 30/0211* (2013.01); *G06Q 30/02* (2013.01); *G06Q 30/0207* (2013.01);

(Continued)

(58) Field of Classification Search
None
See application file for complete search history.

(56) References Cited

U.S. PATENT DOCUMENTS 5,710,886 A 1/1998 Christensen et al.
5,832,458 A 11/1998 Jones (Continued)

FOREIGN PATENT DOCUMENTS

EP 598469 A2 5/1994
WO 0077979 12/2000

(Continued)

OTHER PUBLICATIONS

"Biometrics Explained" (International Biometric Group, LLC) (Year: 2001).*

(Continued)

*Primary Examiner* — James M Detweiler

(74) *Attorney, Agent, or Firm* — Allen, Dyer, Doppelt + Gilchrist, P.A.

(57) ABSTRACT

Methods and systems for utilizing promotion data accessible via a mobile device are disclosed. A digital record of promotion data from a product provider may be stored in a database. A plurality of such digital records may be aggregated for one or more providers. A digital record may be associated with an incentive account associated with an individual. An electronic request to apply promotion data associated with the individual to a transaction and authentication data identifying the individual may be received. A digital record associated with the individual's incentive account may be located and transmitted to a transaction processing system. A processing result record associated with the digital record may be received from the processing system. Usage information derived from the processing result record may be associated in a database.

16 Claims, 10 Drawing Sheets

Mobile Server 102
Mobile Device 138
Carrier Network 132
Voice Gateway 160
Messaging Gateway 162
Data Application Gateway 164
WAP Gateway 166
Device Manager 168
Mobile Controller 158
Portal 156
Point of Transaction 104
Mobile Incentive Management Service 100
Authentication Server 136
MIMS Controller 130
Product Provider Locator Application 148
Device Registration Database 134
Targeted Mobile Incentive Database 128
Targeted Mobile Incentive Server 126
Targeting Engine 124
Targeting Engine Data Warehouse 122
Electronic Wallet Server 140
Product Provider Data Server 120
Knowledge Database 146
Biometric Database 144
Electronic Wallet Database 142
Product Provider Location Database 102
Product Inventory Database 104
Client Information Database 106
Transaction Database 110
Product Taxonomy Database 112
Client Segmentation Database 114
Mobile Incentive Database 116
Campaign Manager 118
Product Provider Subcomponent 106
Product Provider 170
Location Service 152

Related U.S. Application Data

(60) Provisional application No. 60/940,150, filed on May 25, 2007, provisional application No. 60/829,691, filed on Oct. 17, 2006.

(52) U.S. Cl.
CPC ..... *G06Q 30/0236* (2013.01); *G06Q 30/0238* (2013.01); *G06Q 30/0241* (2013.01); *G06Q 30/0267* (2013.01)

(56) References Cited

U.S. PATENT DOCUMENTS 5,848,397 A 11/1998 Marsh et al.
6,009,411 A 12/1999 Kepecs
6,035,280 A 3/2000 Christensen
6,240,394 B1 5/2001 Uecker et al.
6,330,543 B1 12/2001 Kepecs
6,385,591 B1 5/2002 Mankoff
6,535,582 B1 3/2003 Harris
6,571,279 B1 5/2003 Herz et al.
6,601,040 B1 7/2003 Kolls
6,684,195 B1 1/2004 Deaton et al.
6,868,426 B1 3/2005 Mankoff
6,925,441 B1 8/2005 Jones, III et al.
6,934,684 B2 8/2005 Alpdemir et al.
7,058,591 B2 6/2006 Giuliani et al.
7,110,792 B2 9/2006 Rosenberg
7,512,567 B2 3/2009 Bemmel et al.
7,593,862 B2 9/2009 Mankoff
8,412,566 B2 4/2013 Quatse et al.
8,589,238 B2 11/2013 Cooper et al.
2001/0000535 A1 4/2001 Lapsley et al.
2001/0013011 A1 8/2001 Day et al.
2001/0014868 A1 8/2001 Herz et al.
2002/0004783 A1 1/2002 Paltenghe et al.
2002/0013728 A1* 1/2002 Wilkman ............... G06Q 30/02 705/14.53
2002/0013736 A1 1/2002 l'Anson et al.
2002/0029172 A1 3/2002 l'Anson et al.
2002/0046084 A1 4/2002 Steele et al.
2002/0049631 A1 4/2002 Williams
2002/0065774 A1 5/2002 Young et al.
2002/0077909 A1 6/2002 Kanojia et al.
2002/0091571 A1 7/2002 Thomas et al.
2002/0107755 A1 8/2002 Steed et al.
2002/0116271 A1 8/2002 Mankoff
2002/0120627 A1 8/2002 Mankoff
2002/0128908 A1 9/2002 Levin et al.
2002/0147642 A1 10/2002 Avallone et al.
2002/0178060 A1 11/2002 Sheehan
2002/0184538 A1* 12/2002 Sugimura ............... G06F 21/32 726/5
2003/0004808 A1 1/2003 Elhaoussine et al.
2003/0028518 A1 2/2003 Mankoff
2003/0041050 A1 2/2003 Smith et al.
2003/0074209 A1 4/2003 Tobin
2003/0088461 A1 5/2003 Christensen
2003/0208754 A1 11/2003 Sridhar et al.
2003/0217332 A1 11/2003 Smith et al.
2003/0217333 A1 11/2003 Smith et al.
2003/0230630 A1 12/2003 Whipple et al.
2004/0002897 A1 1/2004 Vishik
2004/0083170 A1 4/2004 Bam et al.
2004/0107170 A1 6/2004 Labrou et al.
2004/0128197 A1 7/2004 Bam et al.
2004/0137886 A1 7/2004 Ross et al.
2004/0181448 A1 9/2004 Hartsman et al.
2004/0193487 A1 9/2004 Purcell et al.
2004/0224693 A1 11/2004 O'Neil et al.
2004/0249712 A1* 12/2004 Brown .................. G06Q 30/02 705/14.19
2004/0267674 A1 12/2004 Feng et al.
2005/0071230 A1 3/2005 Mankoff
2005/0075932 A1 4/2005 Mankoff
2005/0109838 A1 5/2005 Linlor
2005/0187873 A1 8/2005 Labrou et al.
2005/0216354 A1 9/2005 Bam et al.
2005/0222996 A1 10/2005 Yalamanchi
2005/0234771 A1* 10/2005 Register ................ G06Q 30/02 705/14.25
2006/0004627 A1 1/2006 Baluja
2006/0026067 A1 2/2006 Nicholas et al.
2006/0069664 A1 3/2006 Ling et al.
2006/0074769 A1 4/2006 Looney et al.
2006/0074784 A1 4/2006 Brown
2006/0095324 A1 5/2006 Vergeyle et al.
2006/0136546 A1 6/2006 Trioano et al.
2006/0143080 A1 6/2006 Garg et al.
2006/0149624 A1* 7/2006 Baluja ................ G06Q 30/0255 705/14.53
2006/0178986 A1* 8/2006 Giordano .............. G06Q 20/04 705/40
2006/0210126 A1* 9/2006 Cho ......................... G07C 9/37 382/124
2006/0253468 A1 11/2006 Ramsey et al.
2007/0050259 A1 3/2007 Wesley
2007/0050529 A1 3/2007 Wesley
2007/0052672 A1* 3/2007 Ritter .................. G02B 27/017 345/156
2007/0055517 A1 3/2007 Spector
2007/0064904 A1 3/2007 Wesley
2007/0073650 A1 3/2007 Lueck
2007/0088801 A1 4/2007 Levkovitz et al.
2007/0088838 A1 4/2007 Levkovitz et al.
2007/0088851 A1 4/2007 Levkovitz et al.
2007/0088852 A1 4/2007 Levkovitz
2007/0136131 A1 6/2007 Mankoff
2007/0162461 A1 7/2007 Mankoff
2007/0174117 A1 7/2007 Hendrickson et al.
2007/0175978 A1 8/2007 Stambaugh
2007/0179789 A1 8/2007 Bennett
2007/0250380 A1 10/2007 Mankoff
2007/0282677 A1 12/2007 Carpenter et al.
2008/0097851 A1 4/2008 Bemmel et al.
2009/0177540 A1 7/2009 Quatse et al.
2013/0268356 A1 10/2013 Quatse et al.

FOREIGN PATENT DOCUMENTS

WO 0161559 8/2001
WO WO 01/57757 A1 8/2001
WO WO 02/015454 A1 2/2002
WO 03044711 5/2003
WO WO 2004/010257 A2 1/2004
WO 05059676 6/2005
WO WO 2005/076828 A2 8/2005
WO WO 2006/061840 A2 6/2006
WO WO 2006/128171 A2 11/2006

OTHER PUBLICATIONS

International Search Report and Written Opinion dated Feb. 4, 2008 for International Application No. PCT/US2007/081499.
Biometric Security, Ltd. "Voice Vault Caller Authentication," (http://www.voicevault.com/ca.aspx) 2007.
Biometric Security, Ltd. "Voice Vault Caller Authentication," (http://www.voicevault.com/wa.aspx), 2007.
Cellfire, Inc., "How it Works," (http://www.cellfire.com/howitworks), 2006.
Chester et al., "Complaint and Request for Inquiry and Injunctive Relief Concerning Unfair and Deceptive Online Marketing Practices," Nov. 2006.
Mobilelime, "Earn Rewards & More," (http://www.mobilelime.com/mobilelime/home.do?action=earnrewards), 2006.
NCS Mobile Payment GmbH, "Crandy: Pay With Your Cell Phone—How can you check your Bonus Status?" (http://www.candy.com/homepage/us/bonus/bonus.jsp), Sep. 2005.
Nearby Now, Inc., "NearbyNow is the next revolution in retail," (http://nearbynow.com/retailers.html), 2005.
Netinformer, LLC, "Mobile Advertising," (http://www.netinformer.com/advertising/index.html), 2005.

(56) References Cited

OTHER PUBLICATIONS

Netinformer, LLC, "Mobile Coupons," (http://www.netinformer.com/advertising/coupons.html), 2005.
Ping Mobile, LLC, "Ping Rewards: About Us," (http://www.pingrewards.com/about_u.aspx), 2006.
PRWeb Press Release Newswire, "Quickpons.com Launches New Advertising Methods that Merges Coupons, Cell Phones and the Internet," (http://www.prweb.com/releases/2006/05/prweb390546.htm), May 2006.
Biometric Security, "VoiceVault World Leaders in Voice Verification—Web Authentication," http://www.voicevault.com/wa.aspx, 2007, 2 pages.

* cited by examiner

METHODS AND SYSTEMS FOR DISTRIBUTING INFORMATION VIA MOBILE DEVICES AND ENABLING ITS USE AT A POINT OF TRANSACTION

CLAIM OF PRIORITY AND RELATED APPLICATION

This application is a continuation of U.S. application Ser. No. 11/873,133 entitled "Method of Distributing Information Via Mobile Devices and Enabling Its Use at a Point of Transaction," which was filed Oct. 16, 2007 and claimed priority benefit under 35 U.S.C. § 119(e) from provisional application No. 60/829,691, filed Oct. 17, 2006, and from provisional application No. 60/940,150, filed May 25, 2007. All of the foregoing applications are hereby incorporated by reference herein, in their entirety, for all purposes.

TECHNICAL FIELD

The disclosed embodiments pertain to distributing information via mobile devices, and more specifically, to delivering promotion data to individuals via mobile devices, enabling use of this information at a point of transaction, and recording tracking data regarding the use of the information.

BACKGROUND

Various services exist that allow individuals to receive marketing offers via their mobile devices, such as mobile phones. Such electronic marketing offers are known as "mobile coupons" or "m-coupons." To utilize typical mobile marketing services, one first enrolls with the service by providing his mobile phone number via a website or by sending a text message to the service from his mobile phone. For example, to use the PingRewards service, one accesses the company's website via the Internet and registers his name, mobile phone number, and a password, and selects participating stores from which he wishes to receive offers. As another example, NetInformer allows an individual to register by sending a text message to its service, which then responds with a text message asking the person if he wishes to enroll, to which he responds to do so. Once the individual is enrolled, these services periodically provide m-coupons to his registered mobile phone. In addition, some services allow one to request offers for a particular merchant online rather than waiting for delivery. For example, an individual can access a mobile marketing service website, locate a merchant by city, select an offer from that merchant, and then provide his mobile phone number so that the service can send him the m-coupon as a text message. However, although one can authorize the service to provide similar offers automatically, the initial request is limited to a website interface and, therefore, an individual must have Internet access to request a particular m-coupon. Furthermore, each time he wishes to request a different type of m-coupon, he must access the website and repeat the procedure.

The aforementioned mobile marketing services provide text messages containing offer information. The frequency of distribution is dependent upon the service. To redeem the m-coupon, the recipient provides the offer information, such as a coupon code included in a text message, at a point of sale ("POS") with the appropriate merchant. Typically, the individual either presents the display of his mobile device to the clerk operating the POS or reads the offer information from the display to him.

While such services are arguably more convenient than traditional marketing methods, such as coupons, they are not without their faults. Current mobile marketing systems lack a mechanism for ensuring that offers sent to a recipient's mobile device are actually of interest to him. For example, although PingRewards and NetInformer provide their services free of charge, the recipient is liable for any charges he may incur from his mobile carrier for using such services. That is, since the m-coupons are delivered as text messages, the recipient's mobile carrier bills him appropriately for receiving text messages. While a text message charge could be negligible, one could grow frustrated if he is charged for an m-coupon of no interest to him. Although current mobile marketing services may allow a participant to specify one or more merchants from which he wishes to receive offers, a merchant may offer a variety of products and thus be associated with a wide range of m-coupons. As the recipient lacks a sufficient avenue to refine his preferences with the service and, likewise, as the mobile marketing service (and thus, the product provider) has no method of ascertaining which distributed offers the individual is actively reviewing, the service may provide him with offers for an overly broad range of products. As the individual may only be interested in a few of the merchant's products, if he continually receives m-coupons that are of no use to him, he may grow dissatisfied with the service, and possibly the merchant as well. Moreover, mobile carrier fees (e.g., text message charges) could accumulate if the mobile marketing service provides m-coupons frequently and/or via multiple messages. Unless the recipient utilizes the majority of the m-coupons he receives, he could spend more money receiving m-coupons than he saves redeeming them.

Additionally, traditional m-coupons are typically sent one at a time with each message containing coupon information to be presented during the transaction. As it can be cumbersome for individuals to peruse multiple m-coupons stored in a mobile device, such as in its text message inbox, this may be unappealing to the recipient. For example, a person may only be able to open one message at a time, have to delete uninteresting or expired m-coupon messages, save interesting ones, and so on. Furthermore, receiving a separate message for each m-coupon can make it difficult to associate related m-coupons or to prioritize them. A recipient can also have trouble finding an m-coupon on his device. For example, since the character limit of a text message subject header is typically too small to reveal much information about the offer, one has to open each text message to ascertain its contents. Such problems lessen the appeal of m-coupons, and consequently one could be less inclined to review them. This could make time-sensitive offers less effective, as they may expire before a recipient has had sufficient time to examine them.

In addition to the problems typical m-coupons can cause for individuals, they also can be less appealing to product providers, such as merchants and manufacturers. For example, text messaging functions, such as Short Message Service ("SMS"), are typically limited to ASCII characters only, and therefore do not allow for graphical product placement. That is, a text message is typically limited to a short, black and white text description, rather than a colorful, graphic advertisement. Furthermore, a text message is generally limited to a maximum of 160 characters, which can limit the number of offers presented in a message (e.g., only one).

Regardless of the method of delivery, such mobile marketing services require that the recipient present information obtained from his mobile device while at a POS. If an individual wishes to redeem more than one m-coupon, he must present the information for each one. For example, although the service Cellfire does not utilize text messages, it still requires that one present a coupon code at a POS. Thus, although such mobile marketing services may provide greater convenience when acquiring offers, requiring the recipient to present his mobile device or provide offer information during the transaction makes such services little better than traditional coupons during redemption. Additionally, a person may find it inconvenient to use his mobile device while he is at a POS (e.g., to navigate through his text message inbox or to use an application), especially if he must do so for each m-coupon he wishes to redeem. For example, if a store is particularly busy, one may not wish to sort through his text message inbox while other customers wait behind him.

While the MobileLime service does not require individuals to present offer information at a POS, its services are limited to the loyalty programs of participating merchants and cannot present offers unrelated to such programs. The MobileLime service allows individuals to register merchant loyalty card numbers with their MobileLime account via the MobileLime website. When the individual is conducting a transaction at that merchant, he provides his mobile phone number at the POS instead of his loyalty card (e.g., types it in via a PIN pad or speaks it to the clerk). One can also opt to receive text message alerts from such merchants. While this configuration alleviates the need to carry a particular merchant's loyalty card, the individual is limited to receiving discounts associated with the merchant's loyalty program. The MobileLime service is not enabled to provide the individual with direct offers from manufacturers or the like. Furthermore, as the MobileLime service is tied exclusively to loyalty programs, it is of no benefit when a person shops at a store without a loyalty program or at a store with a loyalty program in which he has not enrolled.

The aforementioned mobile marketing services all operate under the assumption that the holder of the mobile device is the authorized m-coupon recipient and that he will be the individual redeeming the m-coupon. This scenario may be sufficient if a participating product provider is not concerned with precision regarding receipt or redemption. However, if a product provider wishes to ensure that only the proper individual receives the m-coupon and redeems it, such solutions are inadequate. For example, a product provider may wish to distribute m-coupons of a sensitive nature, such as offers related to an individual's healthcare or for age-restricted products, and, as such, receipt by the proper person is highly important. However, because the receipt of the m-coupon is not explicitly tied to the recipient, delivery and redemption accuracy cannot be ensured. Another person could appropriate (e.g., borrow or steal) the proper recipient's mobile phone and view such m-coupons instead of the desired recipient. Additionally, a product provider could wish to ensure that only the correct recipients redeem distributed m-coupons (e.g., to evaluate the effectiveness of the offer), yet current services lack a way to do so. For example, an m-coupon could be designed for a particular target group, such as men between the ages of eighteen and thirty. Even if the correct recipient receives the m-coupon, he could allow someone else to utilize it, such as by loaning his mobile phone, or by sharing the offer information. Moreover, for services such as MobileLime, another individual need not be aware of a particular offer, but rather need only provide the individual's identification information (e.g., mobile phone number) at the POS to attempt to redeem associated offers. For such reasons, an individual outside the target group can redeem the m-coupon and the mobile marketing service, and the product provider, has no way of knowing this. If the product provider analyzes the use of its offers to refine and evaluate its marketing strategy, the accuracy of this information can be of critical importance. For example, a product provider could mistakenly determine that an offer was a success because it was redeemed, but be unaware that the targeted recipient did not use it. As such, the product provider could continue to provide him with similar offers, even though the recipient has no interest in them.

Accordingly, there is a need for a method and system that can provide a convenient mechanism of receiving and using relevant information, an effective way of ensuring that only the appropriate recipients are utilizing such information, and an accurate manner of reporting the use of the information.

SUMMARY

The present invention utilizes an individual's mobile device to provide a convenient avenue of selecting, receiving, and utilizing information of interest. In an embodiment, an individual can opt to receive promotion data on his mobile device from a server where it can be stored in association with his participant identifier. When the participant of the system desires to utilize promotion data, he can provide authentication data associated with the participant identifier at a point of transaction, such as by providing a biometric sample. The appropriate information can then retrieved at the point of transaction and applied to the present transaction. Data regarding the usage of the promotion data can be stored and utilized for process refinement.

DETAILED DESCRIPTION

Various embodiments of the invention are discussed in detail below. While specific implementations are discussed, it should be understood that this is done for illustration purposes only. A person with ordinary skill in the relevant art will recognize that other components and configurations can be used without parting from the spirit and scope of the invention. The term "mobile incentive" is employed throughout this disclosure for illustrative purposes only and should not be construed as limiting. The systems and methods described herein can enable the discovery, delivery, distribution, and/or use of various types of information transmitted to a mobile device, and is not limited to marketing-related embodiments. As described herein, a mobile incentive can be thought of, conceptually, as an electronic record containing promotion data, such as offer information, product descriptions, advertisements, or other information, that may be relevant to the recipient. When a mobile incentive is described herein as being transmitted, it is not to be construed as limiting, for the transmission of a mobile incentive could entail the transmission of information contained within the record rather than the electronic record itself.

Figure 1:
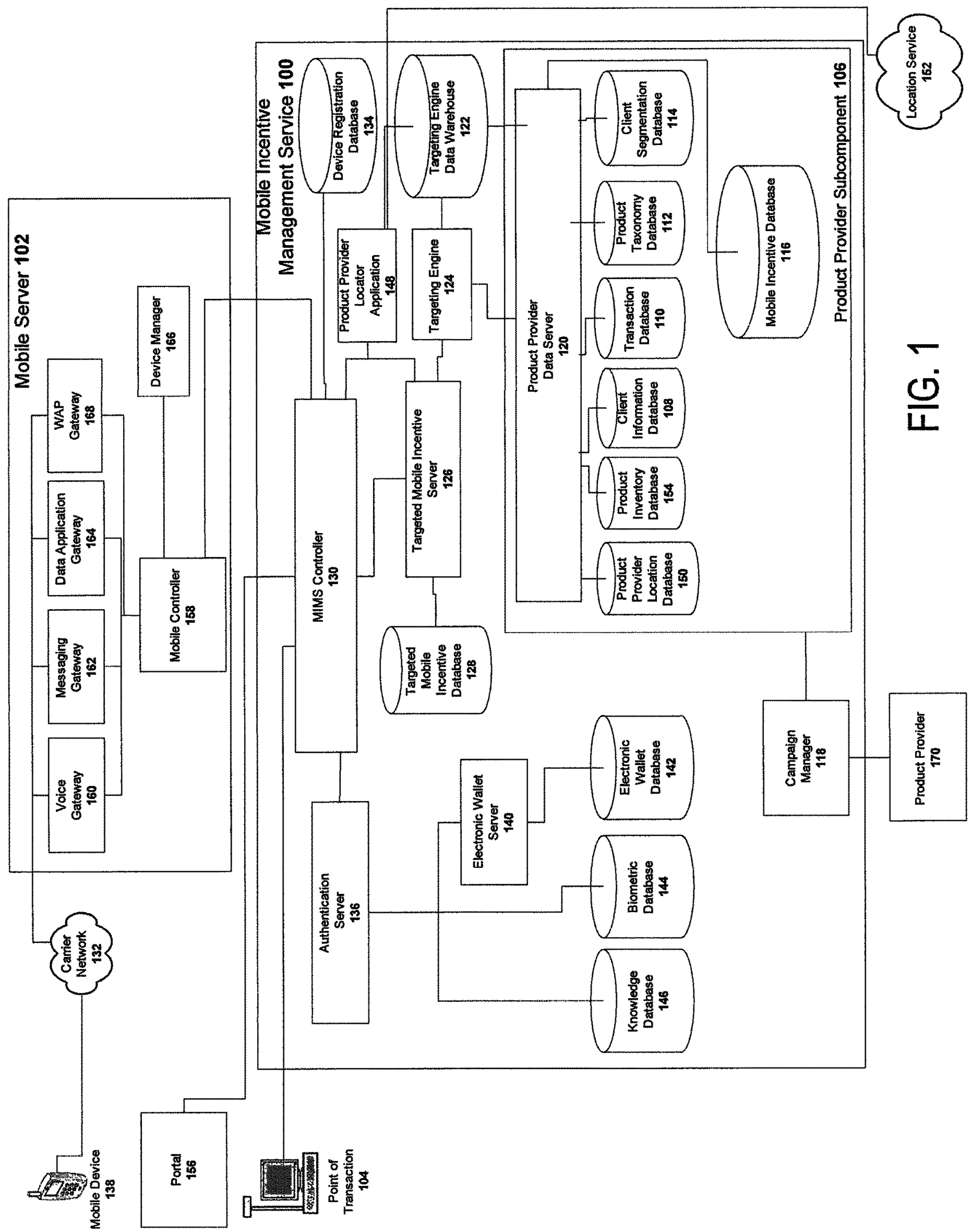
FIG. 1 depicts an exemplary component architecture of a mobile incentive service.

FIG. 1 depicts an exemplary component architecture for a service capable of generating mobile incentives, electronically communicating these mobile incentives to participants of a mobile incentive service via their mobile devices, enabling the use of these mobile incentives at points of transaction, and recording data pertaining to their usage. Those with ordinary skill in the art will recognize that the logical components set forth in FIG. 1 are merely exemplary and that other configurations that provide substantially similar functionality to that of the logical components in FIG. 1 can be used consistent with the scope of the invention. As depicted in FIG. 1, an mobile incentive service can include a mobile server 102 that can enable messaging functionality and mobile incentive delivery, and an mobile incentive management service ("MIMS") 100 that can enable participant authentication, and mobile incentive discovery, distribution, and use.

MIMS Architecture

The MIMS 100 of the mobile incentive service can include a product provider subcomponent 106 which manages data provided by the product provider. A product provider can be a merchant, a manufacturer (sometimes known as "CPGs," or "Consumer Packaged Goods" manufacturers, in certain industries), a healthcare provider, or another provider of goods or services. In one embodiment, the MIMS 100 can maintain a product provider subcomponent 106 for each product provider participating with the mobile incentive service. In another embodiment, the MIMS 100 can maintain one or more consolidated product provider subcomponents 106 which house information from one or more product providers referenced by their product provider identifiers, such as a name, number, or the like. The product provider subcomponent 106 can maintain information regarding the clients of one or more particular product providers in a client information database 108. For example, if a product provider is a merchant, the client information database 108 could contain data regarding its customers or, if a product provider is a healthcare service, the client information database 108 could contain data regarding its subscribers. Such client information can include demographic information (name, address, age, etc.) as well as, if applicable, a client's loyalty or membership identification number. The product provider subcomponent 106 can also maintain a transaction database 110 that receives and keeps track of all the transactions associated with the product provider and other parties (e.g., transaction logs), a product taxonomy database 112 that provides product related codes, product names, unit price, relationships among the various products, and the like for the product provider's inventory, a product inventory database 154 for maintaining records regarding the stock of a product provider's products, and/or a client segmentation database 114 that can provide spending level information for each of the product provider's clients. Additionally, a product provider location database 150 can maintain information related to the product provider's location(s), such as a street address, shopping region (e.g., merchant district, shopping mall, etc.), and the like. The foregoing databases can be kept up-to-date by regular file transmission updates from the product provider's own systems, for example, on a daily or weekly batch basis, depending upon the embodiment. In another embodiment, one or more of the aforementioned databases could be updated in real-time (or near to real-time). In one scenario, the product inventory database 154 could maintain a real-time account of a product provider's inventory and, as such, mobile incentives associated with various products could be adjusted per the inventory. For instance, a mobile incentive could indicate how many units of a product are left, thereby imparting a sense of urgency to obtain the product or an incentive could be made unavailable if the associated product becomes out of stock. In other embodiments, product information such as product related codes, product name, unit price, and the like could be provided separately from the product taxonomy, such that there could exist a separate master product file or database that contains the foregoing product attributes in addition to the product taxonomy database 112. Such embodiments provide flexibility for the product provider when choosing whether to provide sensitive information to the MIMS 100. Alternatively, a product provider subcomponent 106 may exist separately from the MIMS 100 and be managed by a third party entity different from the MIMS 100 in some embodiments.

The product provider subcomponent 106 can also maintain a mobile incentive database 116 that maintains and organizes digital records of mobile incentives as created by the product providers. Product provider employees can interact with the product provider subcomponent 106 via a component, such as the campaign manager 118, which includes an interface, such as a web interface. Product provider employees can create or upload mobile incentives and store them in the mobile incentive database 116 and pool them, if desired, into sets (i.e., "an mobile incentive pool") with common characteristics (e.g., effective date, expiration date, publication date, etc.). In one embodiment, a mobile incentive can be an offer for a discount off the regular price of a product, a discount off a total purchase price, or the like. Mobile incentives can have certain rules and restrictions associated therewith, including a limit per participant, a maximum number distributable to all participants, and a participant segment profile (e.g., spend level of a participant, frequency of visits of a participant, etc.) which participants must satisfy to be offered the mobile incentives. In another embodiment, a mobile incentive can be an advertisement only and need not include any type of offer. Additionally, each mobile incentive could have a "targeting strategy" associated with it. A particular targeting strategy typically defines a "reference group" of products against which the participant's prior behavior can be analyzed to assess the interest of such a participant in an associated mobile incentive. For example, if the participant rarely purchases any of the products in the reference group, he is assumed to have a low interest in the product related to the mobile incentive. If the participant is a frequent purchaser of products in the reference group, he is assumed to have a high interest in the mobile incentive. The creation of reference groups of products can be a manual process, given the need for the product provider's understanding of its own business and clients.

When the product provider creates a mobile incentive through the campaign manager 118, the product provider can also select a particular target strategy to assign to the mobile incentive. For example, a "reward" strategy may simply utilize the product that is the subject of the mobile incentive itself as the reference group (i.e., a participant's prior purchase of a product is a good indicator that he may be interested in purchasing the product in the future); a "category" strategy defines its reference group as all products that are in the same product taxonomy as the product that is the subject of the mobile incentive (i.e., if a participant has purchased a product in the same product taxonomy as that of the product of the mobile incentive, he may likely have some interest in the mobile incentive as well); and an "upsell" strategy may define its reference group as products in the same taxonomy that have a lower price than the price of the product that is the subject of the mobile incentive (i.e., participants may purchase a more expensive but similar product if it is discounted through an mobile incentive).

A product provider data server 120 can be coupled to one or more of the client information database 108, transaction database 110, product taxonomy database 112, client segmentation database 114, product provider location database 150, product inventory database 154, and the mobile incentive database 116. A product provider subcomponent 106 need not include all, or any, of the aforementioned databases. The particular databases utilized could be determined by the needs of the particular product provider. However, a product provider subcomponent 106 typically will at least include a mobile incentive database 116. The product provider data server 120 can serve as a management gateway (e.g., in order to properly segregate data received from product providers) for product provider systems that transmit data to the various databases of a product provider subcomponent 106 as well as for other components of the MIMS 100 that can request or otherwise receive information from the product provider subcomponent 106. In one embodiment, on a scheduled basis (e.g., in real-time or daily for some databases, weekly or longer for other databases), the product provider subcomponent 106, through the product provider data server 120, may transmit updated client information, transactions, product taxonomies, product provider location data, product inventory data, and/or client segmentation information to a targeting engine data warehouse 122 that is coupled to a targeting engine 124. A product provider employee, may then, for example, through the campaign manager 118 initiate the transmission of a created mobile incentive pool from the mobile incentive database 116 to the targeting engine 124. In alternative embodiments, a mobile incentive pool may have a defined targeting date and/or time at which the product provider data server 120 automatically transmits the mobile incentive pool to the targeting engine 124. In yet another embodiment, a product provider could create a special promotion mobile incentive that could be transmitted to the targeted mobile incentives server 126 without undergoing targeting by the targeting engine 124. Special promotion mobile incentives could be more universal mobile incentives that need not be targeted because they could, for instance, apply to a broad range of participants. For example, a particular merchant could design a special promotion mobile incentive to be distributed as a limited time offer to encourage any participants to visit its location(s).

The targeting engine 124 can conduct a matchmaking process between the mobile incentives in the mobile incentive pool and the participants in the mobile incentive service of the present invention. Upon receiving the mobile incentive pool for targeting from the product provider data server 120, the targeting engine 124 can extract the particular product provider's information (e.g., incentives, transactions, product taxonomies, client information, client segmentation information, location data, inventory data, etc.) that is stored in the targeting engine data warehouse 122 and referenced, for example, by a product provider identifier. For each mobile incentive in the pool, the targeting engine 124 may then calculate the relevance score for each participant based, in part, upon his behavior as indicated through the information from the targeting engine data warehouse 122, assign rankings of the mobile incentives to the participants based on such relevance scores, and allocate the mobile incentives to selected participants who have the highest chance of using such mobile incentives. One example of a methodology for calculating such relevance scores and assigning information to individuals is set forth in U.S. patent application Ser. No. 10/616,486 filed Jul. 8, 2003 which is hereby incorporated by reference in its entirety. Once the targeting engine 124 has targeted the mobile incentives to participants, the targeting engine 124 can transmit such mobile incentive-participant associations (hereinafter, the "targeted mobile incentives") to the targeted mobile incentives server 126, which stores them in the targeted mobile incentives database 128. Such targeted mobile incentives are then ready to be extracted from the targeted mobile incentives database 128 when requested by the MIMS controller 130 (through the targeted mobile incentives server 126) when retrieved by a participant via his mobile device 138 and when utilized by the participant at a point of transaction ("POT") 104, such as a merchant POS, as further detailed below. A targeted mobile incentive may not always be utilized at a POT 104, such as if the mobile incentive pertains to an advertisement only and is not associated with a particular offer.

The MIMS controller 130 can manage the flow of information between the MIMS 100 and the mobile server 102, and thus, with the mobile device 138. For example, the MIMS controller 130 can receive information obtained by the mobile server 102, such as a device identifier or a keyword, and relay this information onto the appropriate components of the MIMS 100. Likewise, the MIMS controller 130 can transmit information from an internal component, such as data from the targeted mobile incentives server 126, to the mobile server 102. Furthermore, the MIMS controller 130 can interact with a portal 156 to enable individuals to enroll as participants in the mobile incentive service or to allow participants to augment registered information. Additionally, the MIMS controller 130 can manage the flow of data between the MIMS 100 and the product provider location (e.g., POT 104), and between the internal components of MIMS 100.

The MIMS 100 can further contain a device registration database 134 that is coupled to the MIMS controller 130 and can contain participants' mobile device information obtained during an enrollment process, such as device identifiers (e.g., mobile phone numbers) and, in some embodiments, device capability information (e.g., device model data, device applications, display size, etc.). The device registration database 134 can associate a participant's device information with a participant identifier, such as an internal identification code, which would enable the targeted mobile incentives server 126 to extract the appropriate mobile incentives for the participant in the targeted mobile incentives database 128 for transmission to the participant's mobile device 138. In one embodiment, an individual's participant identifier can be synonymous with a device identifier (e.g., a mobile phone number).

Furthermore, the MIMS 100 can include a product provider locator application 148 that can assist with location-based mobile incentives. The product provider locator application 148 can obtain location information, such as a postal code provided by the participant or a geographic region determined by a location service 152, and cross reference this information with data stored in targeting engine data warehouse 122 (received from the product provider location database 150) to determine if there are any corresponding product providers. If so, the participant can receive mobile incentives for product providers in a desired location, as described in detail below.

An exemplary embodiment of an MIMS 100 may be further capable of authenticating a participant via a mobile device 138, a portal 156, and/or via a POT 104. Such embodiments of the MIMS 100 may include an authentication server 136 that can authenticate a participant's identity so that he may access his registered information and mobile incentives. Notably, a participant can access and/or use multiple mobile incentives via a single authentication. In addition to being stored in the client information database 108, participant data useful for authentication can be held in other databases. For example, participant biometric data can be held in the biometric database 144, and verification data (such as passwords and security question answers) can be held in the knowledge database 146. In one embodiment, the biometric database 144 can store multiple types of biometric data, such as voice data, fingerprint data, iris data, retinal data, DNA data, or the like. The various biometric types could be stored jointly or could be separated into sub-databases. The authentication server 136 can enable a participant to authenticate himself by providing authentication data, such as a biometric sample or a password, via his mobile device 138 in order to retrieve mobile incentives. Additionally, the authentication server 136 can enable a participant to utilize mobile incentives stored at the MIMS 100 by submitting authentication data at the POT 104. A participant could also supply authentication data via a portal 156 to access his mobile incentive account.

Furthermore, the MIMS 100 may include an electronic wallet server 140 that can provide access to information, such as financial account data and other participant data, held in electronic wallets stored in the electronic wallet database 142 and can thereby enable payment functionality (at the POT 104, via the mobile device 138, etc.). In one embodiment, a participant's mobile incentive account and his electronic wallet can be considered one in the same, thereby providing a unified record for all of the participant's interactions with the systems. In another embodiment, a participant's mobile incentive account can be associated with his electronic wallet, such as via a shared identifier, but maintained as a separate record. For example, electronic wallet functionality could be enabled by an entity other than the one managing mobile incentive functionality. The authentication server 136, in conjunction with the electronic wallet server 140 can allow a participant to access electronic wallet information stored at the MIMS 100, which could be used to provide payment, and could ultimately be sent to a payment processor. For example, the participant could submit a biometric sample at the POT 104, which, once relayed to the authentication server 136, could be used to authenticate the participant and retrieve electronic wallet information. Exemplary embodiments of biometric payment systems are described in U.S. application Ser. No. 11/421,451, filed May 31, 2006, which is hereby incorporated by reference in its entirety. Similarly, components of the MIMS 100 could enable a participant to conduct mobile payment transactions. For example, by accessing payment and shipping information from his electronic wallet, a participant could conduct a transaction completely through use of his mobile device 138. Alternatively, a participant could contact the MIMS 100 via his mobile device 138 to authorize an upcoming payment transaction at the POT 104. When the participant conducts the transaction at the product provider location, the system of the present invention, in addition to retrieving mobile incentives, could retrieve payment information from his electronic wallet and transmit this to the POT 104. An example of systems and methods capable of handling mobile payment functionality is found in U.S. patent application Ser. No. 11/566,987, filed Dec. 5, 2006, the disclosure of which is incorporated herein by reference in its entirety. In another embodiment, the inclusion of electronic wallet functionality could allow the MIMS 100 to enable store credit and/or rebate functionalities. Mobile incentives provided to participants could include store credit or rebates offers, but the system could also handle such tasks independent of mobile incentive functionality. For example, if an mobile incentive provides a participant with store credit (e.g., for a subsequent purchase), rather than receiving a physical credit voucher, the POT 104 could relay the store credit amount to the MIMS 100, which could create a store credit account for the amount within the participant's electronic wallet. Similarly, if the participant is due a rebate for a product purchased at the POT 104, the POT 104 could notify the MIMS 100, which in turn could employ registered participant information to submit the rebate to the appropriate product provider. Furthermore, the MIMS 100 could credit a financial account within an electronic wallet for the rebated amount.

Mobile Server Architecture

As aforementioned, in addition to an MIMS 100, a mobile incentive service can include a mobile server 102. The mobile server 102 described herein can enable messaging functionality, and mobile incentive delivery, however this is not to be construed as limiting, as the mobile server 102 could enable other functionality as well. The mobile controller 158 can interface with the MIMS controller 130 of the MIMS 100. Additionally, the mobile controller 158 can manage communication with a mobile device 138 via one or more gateways, such as a voice gateway 160, a messaging gateway 162, a data application gateway 164, and/or a Wireless Application Protocol ("WAP") gateway 168. The voice gateway 160 can receive and interpret voice channel communications, such as via a telephony interface, dual-tone multi-frequency ("DTMF"), automatic speech recognition ("ASR"), interactive voice response ("IVR"), or the like. The messaging gateway 162 can receive and interpret text message communications, such as Short Message Service ("SMS"), and can send text messages. The data application gateway 164 can receive and interpret data communications, and can manage received data packets, such as email transmissions sent via a mobile data network, such as General Packet Radio Service (GPRS). Furthermore, if the mobile incentive service employs biometric data types other than voice (or if the mobile device 138 converts voice data into a data message), the data application gateway 164 can receive this biometric data. The WAP gateway 168 can transmit and receive WAP communications between the mobile server 102 and the mobile device 138. The device manager 166 can maintain a registry of the characteristics of various mobile devices 138, thereby allowing the mobile controller 158 to format mobile incentive information according to the device capability information obtained from a participant's mobile device 138. For example, the mobile controller 158 could format mobile incentives as a WAP Push page or an SMS message depending upon the capabilities of the mobile device 138 as indicated by the device manager 166. Typically, mobile incentives are accessed via a URL included in one message so that multiple mobile incentives can be viewed at once, rather than being delivered as separate messages. In one embodiment, device capability information can be obtained from the mobile device 138 whenever it communicates with the mobile server 102. As such, participants can change mobile devices 138 without notifying the mobile incentive service (although they may need to do so if the registered device identifier also changes). Alternatively, device capability information for a participant's mobile device 138 could be obtained from the device registration database 134 where it has been registered. If a participant purchases a new mobile device 138, he could access his account to update the stored device capability information.

Those of ordinary skill in the art will recognize that the logical components and databases described in FIG. 1 are merely illustrative and may be distributed in alternative but functionally equivalent designs, including without limitation, the removal of certain components and addition of others, without departing from the scope or spirit of the described embodiments. Rather than being separate entities, the MIMS 100 and the mobile server 102 could be one entity or components illustrated as contained within the MIMS 100 could be found within the mobile server 102 and vice versa. Furthermore, components of the MIMS 100 or the mobile server 102 could also be combined into single components. For example, rather than the MIMS 100 having a separate authentication server 136, MIMS controller 130, electronic wallet server 140, and targeted mobile incentives server 126, certain embodiments may integrate such functional capabilities (or any portion thereof) into a single MIMS controller 130. Additionally, one or more components of the MIMS 100 or mobile server 102 could be hosted by one or more third parties external to the mobile incentive service.

Enrollment

Figure 2:
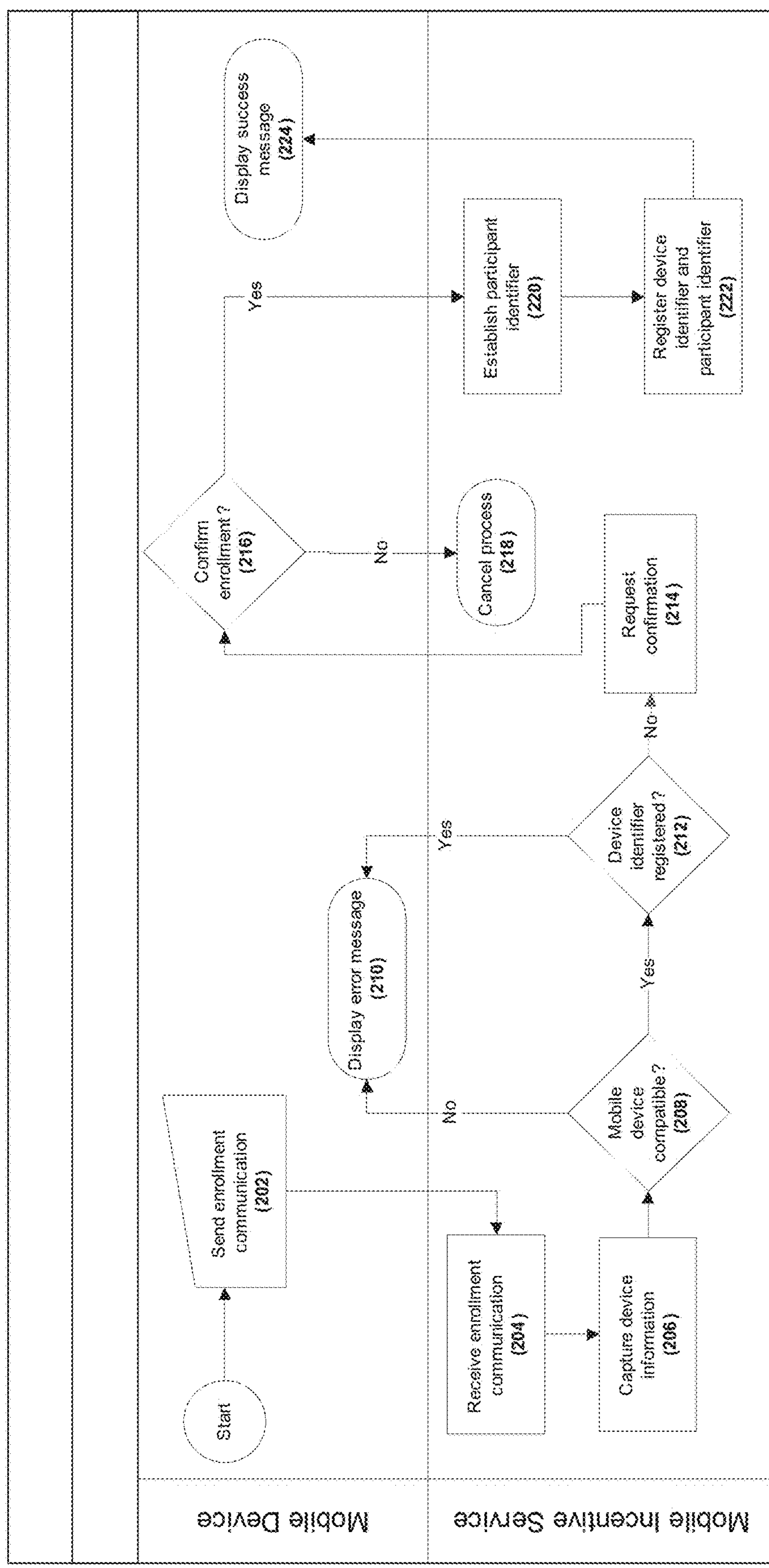
FIG. 2 depicts a flowchart of a process for an individual to enroll with a mobile incentive service provider via a mobile device.

An individual can enroll as a participant with the mobile incentive service of the present invention in a variety of fashions. In one embodiment, an individual can enroll via a tiered process in which the more information he supplies to the mobile incentive service, the more functionality the service provides. FIG. 2 depicts an embodiment of a process in which an individual can enroll via his mobile device 138. Although the mobile device 138 is typically referred to herein as a mobile phone, it could be any portable device capable of performing telecommunication functions, such as a PDA, a handheld computer, or the like. In an alternate embodiment, a mobile device 138 could be a device designed specifically for mobile incentive use, such as a pendant. To begin enrollment, the individual can utilize his mobile device 138 to communicate with the mobile server 102 (step 202). The mobile server 102 can receive the communication from the carrier network 132 via an appropriate gateway 160, 162, 164, 168 (step 204). For example, text messages can be received by the messaging gateway 162 and incoming calls can be received by the voice gateway 160. The gateway 160, 162, 164, 168 can capture device information, such as capability information (e.g., device manufacturer and model information), and a device identifier (e.g., the phone number of the incoming communication), and can route this information to the mobile controller 158 (step 206). The mobile controller 158 can cross-reference the device capability information with the data stored in the device manager 166 to determine if the mobile device 138 is compatible with the mobile incentive service (step 208). If the mobile device 138 is not compatible, an error message can be sent to it and the process can terminate (step 210). If the mobile device 138 is compatible, the mobile controller 158 can route the captured device identifier to the MIMS controller 130, which in turn can determine if the captured device identifier is registered in the device registration database 134 (step 212). If so, an error message can be sent to the mobile device 138 and the process can terminate (step 210). In some scenarios, an individual could desire to enroll with a mobile device 138 already registered with another participant so that both people can use it to receive mobile incentives. Typically, in order to enable a mobile device 138 for multiple participants, individuals (other than the original enrollee) must enroll via a portal 156 (as described below) and the individual could be informed of this by the error message. If the captured device identifier is not registered, the mobile controller 158 can prompt a gateway 160, 162, 164, 168 to transmit a confirmation request to the mobile device 138 (step 214). The confirmation request could include the mobile incentive service's terms and conditions or could provide access to them (such as via a URL). After receiving the confirmation request, the individual can then provide an affirmative or negative response (step 216). For example, the voice gateway 160 can prompt the individual to speak "Yes" or "No" or dial "1" for yes or "2" for No, or the messaging gateway 162 could send a text message asking the him to respond "Yes" or "No" via a text message. If the individual provides a negative response (or does not respond at all), the mobile incentive service may end the enrollment process (step 218). If the individual responds in the positive, the mobile controller 158 can notify the MIMS controller 130 which in turn can establish a participant identifier (step 220). A participant identifier can connect participant information allocated throughout the different components of the mobile incentive service, enabling the service to locate and track a participant's data. In one embodiment, the MIMS controller 130 can generate the participant identifier, such as a unique identification number. This participant identifier can be an internal tool not readily available to the participant or can be made available to the participant (e.g., to provide when presented with customer service issues, to update registered information, etc.). Alternatively, rather than generating a new participant identifier, the MIMS controller 130 can employ a pre-existing participant identifier obtained during enrollment, such as the device identifier (e.g., the mobile phone number). Once a participant identifier has been established, the MIMS controller 130 can register the captured device identifier in association with it, and thus the mobile device 138, in the device registration database 134 (step 222). In one embodiment, device capability information can also be stored in the device registration database 134. In addition to storing the participant identifier with the device registration database 134, the MIMS controller 130 can transmit the participant identifier to one or more product provider subcomponents 106. The product provider data server 120 of the product provider subcomponent 106 can store the participant identifier in the client information database 108, thus enabling the participant for mobile incentive functionality for product providers participating with the mobile incentive service. The participant could be enabled for mobile incentive functionality for all participating product providers or for a default subset of participating product providers. In one embodiment, a participant could specify which product providers he would like to enable. For example, an automated system could prompt him with product provider names and he could indicate those he wishes to enable (e.g., by speaking "yes" or "no"). Once the participant has been registered, the mobile controller 158 can, via the appropriate gateway 160, 162, 164, 168 provide the participant with a message indicating a successful registration (step 224). In one embodiment, the participant is presented with a password, such as a code or PIN, which can be used by the participant to login via a portal 156 to augment his mobile incentive account.

Figure 3:
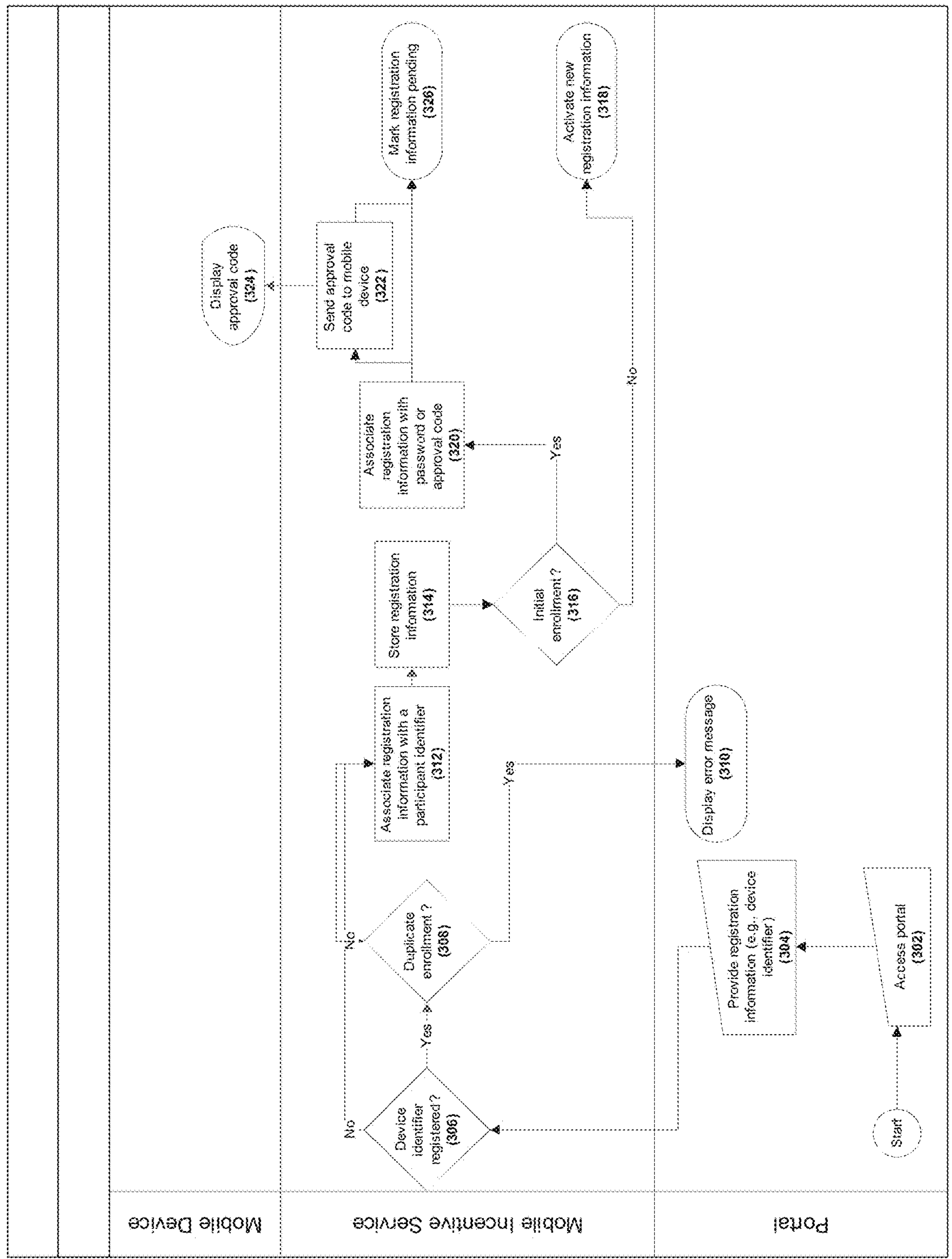
FIG. 3 depicts a flowchart of a process for an individual to enroll with a mobile incentive service provider via a portal.

In other embodiments, a participant can enroll with the mobile incentive service via a portal 156; FIG. 3 depicts a flowchart of such a process. Additionally, a participant who has already registered, such as via his mobile device 138 as described above, could augment his mobile incentive account via the portal 156. In additional to mobile incentive services, the portal 156 could allow a participant to enroll in other services or update other types of account information. For example, a participant could access the portal 156 to enable his account for mobile payment functionality or to access his electronic wallet. The portal 156 can be implemented via various mechanisms, such as a website, a kiosk, a customer service desk, or the like. The individual can access the portal 156 to interface with the MIMS 100 (step 302). If a registered participant is augmenting his existing account, he could be prompted to provide authentication data so that his information can be located. For example, if the participant registered with his mobile device 138, he could be prompted to enter his mobile phone number and the password that was presented to him after his enrollment. Similarly, if an individual had previously begun enrollment via the portal 156 but was unable to complete the process, he could provide authentication data to the portal 156 to resume enrollment.

As with the enrollment method described in FIG. 2, the individual may only need to provide a device identifier, such as his mobile phone number, to enable mobile incentive functionality. The individual could also provide other registration information as prompted, such as an email address, demographic information (e.g., name, age, gender, date of birth, address, etc.), financial account information (e.g., credit, debit, or checking account numbers, etc.), verification data (e.g., mother's maiden name, a password, etc.), healthcare information (e.g., policy number, insurance carrier, etc.) and other similar personal and identity-related information. Additionally, an individual could provide information regarding one or more loyalty or membership accounts (e.g., a card number, the name of a particular product provider or brand, etc.), thereby enabling the mobile incentive service to utilize loyalty or membership program information in conjunction with mobile incentive functionality. An example of systems and methods capable of handling loyalty program functionality is found in U.S. patent application Ser. No. 11/421,458, filed May 31, 2006, the disclosure of which is incorporated herein by reference in its entirety.

As previously mentioned, in addition to the mobile phone number, the individual could provide other information about the mobile device 138, such as mobile carrier information, device capability information (e.g., the manufacturer of the mobile device 138), and other device identifiers (an electronic serial number, a mobile identification number, etc.). In one scenario, the individual is presented with the names and pictures of various mobile devices 138 and prompted to select the name and/or picture that corresponds to his mobile device 138. Additionally, if individual indicates that the mobile device 138 is enabled for email functionality, he could indicate which email address is associated with the mobile device 138.

Furthermore, a person can establish one or more preferences for mobile incentive service. For example, he can specify favorite product providers or products or a preferred mobile incentive type (e.g., percentage discounts, free items, etc.). An individual could indicate whether he would like the mobile incentive service to monitor the location of his mobile device 138 to provide mobile incentives based upon his location. As another example, a person could indicate whether he would like the mobile incentive service to send him mobile incentives without a specific request and, if so, the particulars of the delivery (e.g., based upon his location or registered preferences, daily, weekly, the maximum amount to be sent in a time period, etc.). Various preferences can be employed by the system to provide a participant with mobile incentives particular to the participant's desires. For example, a participant could set his preferences so that he only receives mobile incentives in the vicinity of a particular location and only for products or product providers he has specified. In an alternate embodiment, an individual can provide an email address, but not associate it directly with his mobile device 138. Instead, he could authorize the mobile incentive service to send mobile incentives to both his mobile device 138 and his email address simultaneously or he could specify which mobile incentives are to be sent to his mobile device 138 and which are to be sent to the email address.

A participant need not provide all his registration at one session (although for an initial enrollment, he typically must provide enough information to enable service, such as a device identifier). Rather, he could provide particular registration information at various sessions, each time enabling his mobile incentive account with greater functionality. For example, a participant could first enroll with the mobile incentive service via his mobile device 138. He could subsequently access the portal 156 to provide loyalty or membership program information to enable mobile incentive service for the associated product providers (e.g., to add product providers that were not automatically enabled during his initial enrollment). In yet another subsequent session, the participant could access the portal 156 to add demographic information, thereby enabling the service to provide more precise mobile incentives or to enable age verification. In one embodiment, the value of the mobile incentives provided to the participant can be determined by the quantity and/or type of information that the participant has registered. For example, a participant that only registers his mobile phone number may receive offers for a smaller discount than a participant who has also registered his mailing address and email address. As another example, the transaction history associated with a loyalty account may be of particular value to the mobile incentive service and a participant who registers his loyalty number for a participating product provider (thereby granting the mobile incentive service access to his transaction history) may receive better mobile incentives than one who has not.

Once entered, registration information can be sent to the MIMS controller 130. As with the process described above, in the scenario of a new enrollment, the MIMS controller 130 can determine if the device identifier has been previously registered in the device registration database 134 (step 306). If the device identifier has been registered, the MIMS controller 130 can determine if the individual has initiated a duplicate enrollment (step 308). In some embodiments more than one person could be allowed to register for the same mobile device 138. For example, a husband and wife could share the same mobile phone. Multiple participants can be associated (e.g., via their participant identifiers) with the information stored in the device registration database 134 for a particular mobile device 138. Conversely, one participant could register more than one device identifier (i.e., more than one mobile device 138). For example, a participant could have a business mobile phone and a personal mobile phone and wish to use both for mobile incentives. As such, a participant can be associated (e.g., via a participant identifier) with more than one mobile device 138 registered in the device registration database 134. The MIMS controller 130 can evaluate other received information, such as the individual's name, to determine if it is truly a duplicate enrollment. Additionally, the enrolling person could be prompted to confirm that he is authorized to use the previously enrolled mobile device 138. If the MIMS controller 130 determines that a person has initiated a duplicate enrollment or is not authorized to use the mobile device 138, the procedure could be cancelled and an error message could be displayed at the portal (step 310). If the MIMS controller 130 determines that enrollment is not a duplicate, the process can proceed.

The MIMS controller 130 can next associate a participant identifier with the registration information (step 312), and can store the information in association with the participant identifier (step 314). The MIMS controller 130 can store the device identifier in the device registration database 134. Other registration information can be sent to one or more product provider subcomponents 106, where the product provider data server 120 can store it within the client information database 108 (step 314). The participant could be enabled for mobile incentive functionality for all participating product providers, a default subset of participating product providers, or only for those product providers he has specified via his preferences. Additionally, the MIMS controller 130 can route one or more elements of the received registration information to the authentication server 136 for storage (e.g., in the knowledge database 146, or the electronic wallet database 142). In one embodiment, rather than prompting the participant to create a password, the MIMS controller 130 or the participant can select an element of the received registration information or a combination of elements to be used. For example, a password could consist of digits from a participant's product provider loyalty account number and digits from his mobile phone number.

If a participant accesses the portal 156 to update previously registered information (as opposed to enrolling), the MIMS controller 130 can associate the updated registration information with the appropriate participant identifier in the appropriate database(s). If the participant is aware of his participant identifier, he could provide it via the portal 156. If the participant identifier is not known by the individual, the MIMS controller 130 can locate it once he has been verified, such as via biometric authentication and/or verification data, and then appropriately update the registration information associated with it.

The MIMS controller 130 can determine whether the individual is undergoing an initial enrollment or updating an existing mobile incentive account (step 316). If a participant is updating a previously created mobile incentive account (e.g., he initially enrolled via his mobile device 138), typically the MIMS controller 130 can mark the newly provided registration information activated for use (step 318). Alternatively, it could be marked pending until the participant verifies and/or authorizes the changes made. If a person is undergoing his initial enrollment via the portal 156, the MIMS controller 130 can associate the registration information with a password or an approval code (step 320). As mentioned, a password can be verification data registered by the participant, such as a PIN, knowledge-based information (e.g., mother's maiden name), or the like. Alternatively, the MIMS controller 130 can generate an approval code. The approval code can be a unique set of alphanumeric data generated by the MIMS controller 130 and can be sent to the participant's mobile device 138 (step 322). The MIMS controller 130 can transmit the approval code to the mobile controller 158, which in turn can transmit it as a text message via the messaging gateway 162 to be displayed on the mobile device 138 (step 324). Once the registration information has been associated with a password or approval code, it can be marked pending (step 326). Typically, the password or approval code is stored in association with the participant identifier in the knowledge database 146, and the registration information is not enabled for use until the participant completes enrollment by activating it through an authentication process, as described below.

Figure 4:
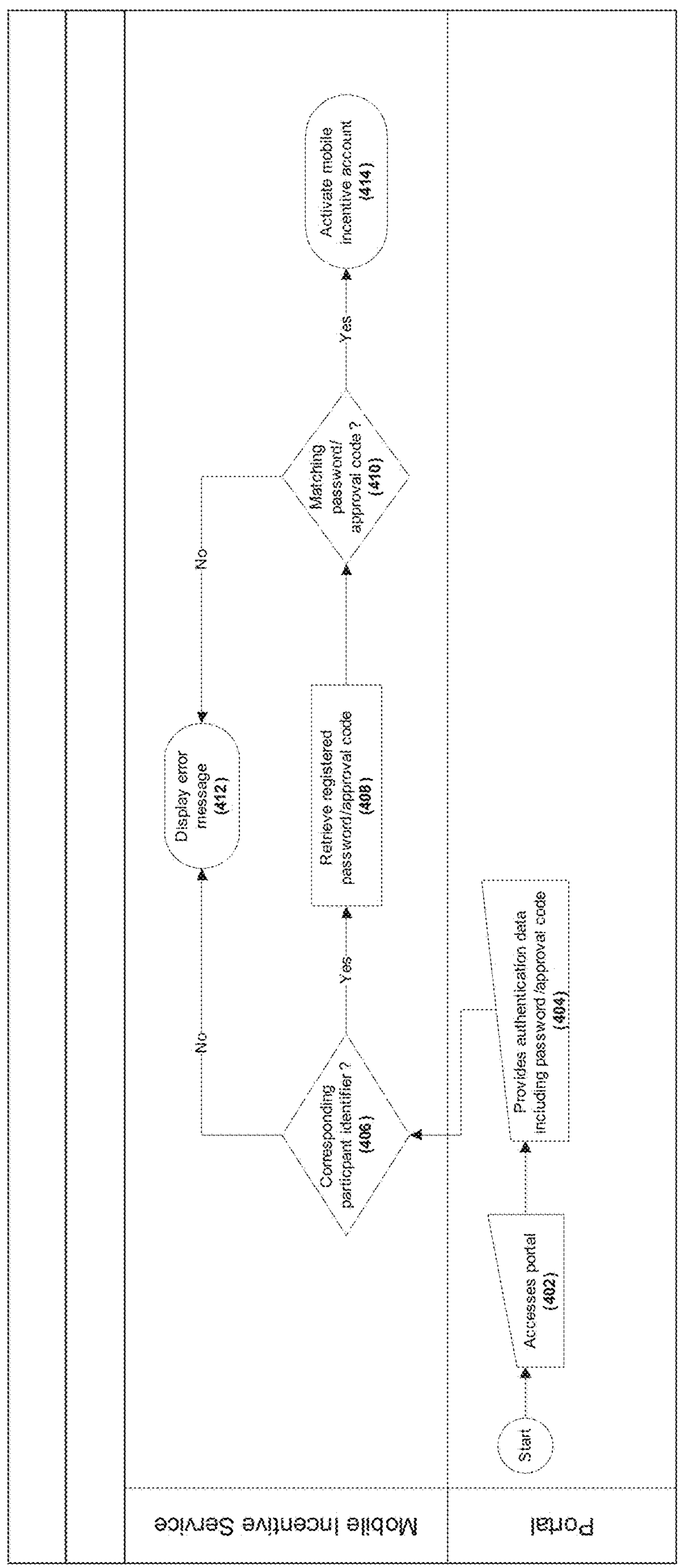
FIG. 4 depicts a flowchart of a process for an individual to activate a mobile incentive account via a portal.

To activate a mobile incentive account created during enrollment via the portal 156, the participant can undergo the process illustrated by the flowchart depicted in FIG. 4. The participant can access the portal 156 (step 402) and enter authentication data including the password or approval code associated with his account (step 404). The authentication data could also include a mobile phone number, a name, or the like associated with the registered participant identifier or, if known, the participant identifier itself could be provided. The participant could do so during the same session at which he provided the registration information or could do so at a subsequent session. The received authentication data can be sent from the portal 156 to the MIMS controller 130, which can determine if the authentication data is associated with a participant identifier (step 406). If not, the MIMS controller 130 can prompt the portal 156 to display an error message (step 412). If there is an associated participant identifier, the MIMS controller 130 can prompt the authentication server 136 to retrieve the associated registered password or approval code from the knowledge database 146 (step 408). For example, if the authentication data includes a mobile phone number, the MIMS controller 130 can determine if this mobile phone is registered, and if so, retrieve the associated participant identifier. The MIMS controller 130 can then share the participant identifier and received password or approval code with the authentication server 136, which can determine if the password or approval code stored within the knowledge database 146 matches the received password or approval code (step 410). If there is a match, the authentication server 136 can notify the MIMS controller 130, which then can activate the participant's registration information associated throughout the system (i.e., the mobile incentive account is activated) (step 414). If a matching password or approval code is not located, the MIMS controller 130 can prompt the portal 156 to display an error message (step 412).

Depending upon the embodiment, a participant could be requested to provide biometric data during the activation process. In other embodiments, while a participant may not need to provide biometric data to activate his mobile incentive account, he may do so to enable greater functionality, such as age verification and biometric payments. As aforementioned, the information a participant registers may affect the quality of the mobile incentives he receives. A participant that registers data that allows for the use of strong authentication, such multi-factor and/or biometric authentication, may receive better mobile incentives than a participant who does not. The system of the present invention can utilize various types of biometric data, such as fingerprints, iris scans, vein patterns, voice data, and the like, as would be determined per implementation. Once the participant has successfully verified himself via the process above, he could be prompted to provide biometric data to the portal 156 if the portal 156 is properly equipped with a biometric access point ("BAP"). For example, the portal 156 could be a kiosk or participant service desk equipped with a BAP or a participant could access a website embodiment of the portal 156 via a personal computer equipped with a BAP (e.g., a fingerprint scanner). The portal 156 could route the received biometric data to the MIMS controller 130, which in turn would transmit it to the authentication server 136 for storage within the biometric database 144.

In alternate enrollment embodiments, the mobile incentive service could have access to third party resources, such as financial or demographic databases, and utilize such resources during the enrollment process. For example, the MIMS controller 130 could use utilize these resources to acquire participant information, thereby alleviating the amount of information a participant needs to provide. Furthermore, before activating a participant's registration information, the mobile incentive service could use such resources to validate received information (e.g., to determine if a mailing address is valid), and/or to perform risk checks (e.g., to evaluate a participant's credit history). In other alternate embodiments, enrollment can be initiated via an application on the mobile device 138 (rather than via a voice channel connection). For example, if the mobile device 138 has an Internet interface, such as a web browser, the mobile device 138, itself, could serve as the portal 156. In another example, an individual can undergo complete enrollment via a voice channel connection via his mobile device 138. The enrollment could begin as depicted in FIG. 2, with MIMS controller 130 determining if the obtained device identifier is registered and prompting the individual to enroll if not. Registration information could be received via various voice channel interfaces, such as ASR, IVR, DTMF, and the like. For enrollment involving the provision of biometric data, the MIMS controller 130 can initiate a biometric data capture process such as the one described below in relation to FIG. 5. Voice data could be received as described or alternate types of biometric data (or voice data converted into a data message via a device application) could be received by the mobile controller 158 via the data application gateway 164 and transferred to the MIMS controller 130. Once the MIMS controller 130 has received sufficient information and, optionally, verified it with third party resources, the participant's mobile incentive account can be marked active. The participant could receive a confirmation message or the mobile incentive service could contact him later (e.g., text message, voice call, etc.). If the participant wishes to enable Internet access for his mobile incentive account, he could register or receive a password for this purpose. Then, to access his mobile incentive account via the Internet, the participant can provide this password and other authentication data via a mobile incentive service website.

Figure 5:
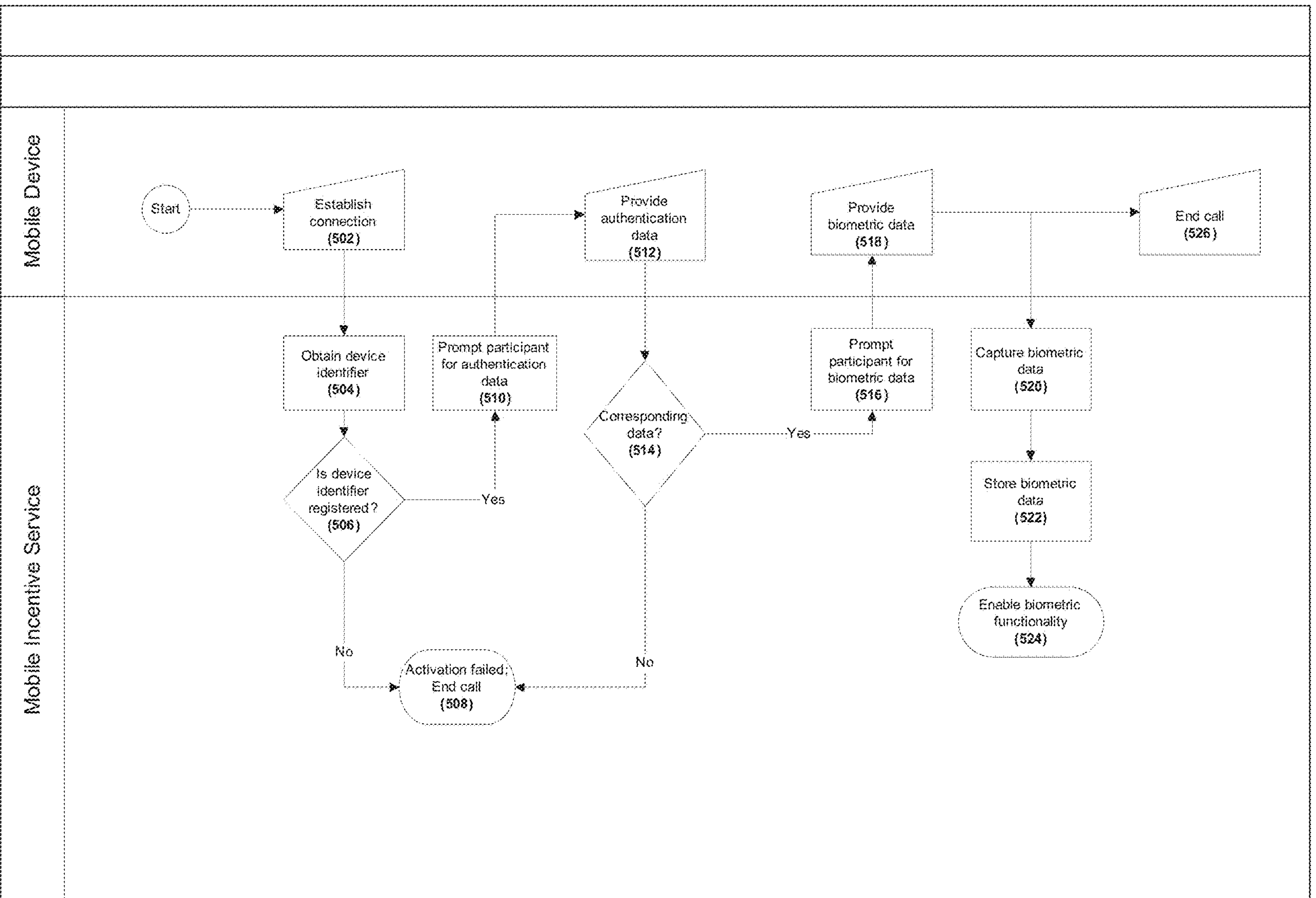
FIG. 5 depicts a flowchart of a process for an individual to enable biometric authentication functionality for a mobile incentive account.

In addition (or in alternative) to providing biometric data via a portal 156, a participant could provide biometric data via his mobile device 138. Typically, a participant can provide voice data via his mobile device 138, but, as aforementioned, other types of biometric data could be provided if the user's mobile device 138 is so equipped. FIG. 5 depicts a process for a participant to register biometric data with his mobile incentive account via his mobile device 138. The participant could perform this process while activating or augmenting his mobile incentive account. A voice channel connection can be established between the participant's mobile device 138 and the mobile controller 158 (step 502). For example, if the participant has just completed registering via a website embodiment of the portal 156, the website could present an HTML button and display a message such as, "Click this button and we will call you to obtain a voice sample!" Additionally or alternatively, the participant could specify a time for the call. In another scenario, the participant could call a service number. In an alternate embodiment, the participant could send a text message to the mobile server 102, which could then initiate a voice channel connection with the mobile device 138.

As aforementioned, voice channel communication between the mobile server 102 and the mobile device 138 could be driven by the voice gateway 160. The voice gateway 160 can obtain a device identifier (e.g., the mobile phone number acquired via caller ID) from the incoming transmission and can forward it to the mobile controller 158, which can in turn relay it to the MIMS controller 130 (step 504). The MIMS controller 130 can verify whether the device identifier is registered in the device registration database 134 (step 506). If so, the MIMS controller 130 can locate the associated participant identifier. As aforementioned, the participant identifier and the device identifier could be one in the same and thus the MIMS controller 130 may not need to locate an associated participant identifier, but merely verify that the device identifier is registered.

If the device identifier is not registered, the participant can be so informed and the call could be terminated (step 508). The mobile controller 156 could connect the participant with a customer service representative or play a recording that explains the issue and provides the participant with instructions to correct the problem. If the device identifier is registered, the MIMS controller 130 can request the mobile controller 158 to prompt the participant for authentication data, such as a password or approval code, in order to verify that he is the authorized participant (step 510). The participant can provide the authentication data via his mobile device 138, such as via speech or DTMF (step 512). Once the mobile controller 158 has obtained the authentication data from the participant, it can be sent (after it has been converted it into a data message) to the MIMS controller 130. The MIMS controller 130 can forward the authentication data to the authentication server 136, which can compare it with data stored in association with the participant identifier in the knowledge database 146 to determine if there is corresponding data (step 514). In an alternate embodiment, if the participant has previously registered one type of biometric data (e.g., a fingerprint) and is attempting to add a second type (e.g., voice data), the authentication data supplied could include the registered type. In such a scenario, the authentication server can compare the received authentication data with data stored in the biometric database 144. If there is not corresponding registered data, the process could be terminated (step 508). In one embodiment, the MIMS controller 130 could note the device identifier, participant identifier, and/or other associated information on a failed enrollment log. The failed enrollment log could be reviewed to determine why participants are failing verification or to detect fraudulent behavior.

If the received authentication data corresponds with registered data, the activation process can continue. The MIMS controller 130 can instruct the mobile controller 158 to request biometric data from the participant (step 516). Typically, the participant will be prompted to provide one or more voice samples. Once the participant provides the requested biometric samples (step 518), the mobile controller 158 can capture them (step 520) and route them to the MIMS controller 130, which in turn relays them to the authentication server 146. The authentication server 146 can extract information from the biometric data, typically generating one or more biometric templates. In an alternate embodiment, before biometric data is transmitted to the mobile server 102, it could be converted into a biometric template via an application on the mobile device 138. Once received, the biometric data can be stored in the biometric database 144 in association with the participant identifier (step 522). If a participant's voice is employed as biometric data, the voice data provided could be based upon one or more particular words or phrases he is prompted to speak. The voice data could be used solely for biometric authentication or, in certain embodiments, could also be used by the authentication server 136 to compare with verification data previously obtained to ensure greater authentication of the enrolling participant. For example, the voice data requested by the mobile controller 158 could be a sample of the participant articulating his mother's maiden name, date of birth, or a password. Rather than separately prompting the participant for separate types of authentication data through steps 510 through 518, the same voice data may be used for both biometric data and verification data authentication purposes. Upon receiving the voice sample, in addition to transmitting the voice data to the mobile controller 158, the voice gateway 160 could also translate the spoken language into a data message containing actual verification data (e.g., the actual name, date of birth, or other alphanumeric data) utilizing ASR technology. The authentication server 136 can compare the data message with registered verification data that is stored in the knowledge database 146 in association with the participant identifier. Additionally, or alternatively, data messages generated during mobile incentive account activation could be stored in association with the participant information in the knowledge database 146 and utilized during participant authentication at subsequent transactions. Once the participant has provided the requested biometric data, the call can be ended (step 526) and the MIMS controller 130 can enable the participant's mobile incentive account for new biometric functionality (step 524).

Regarding voice data, the quality of the voice sample acquired during enrollment could have a bearing on the processes of the mobile incentive service during subsequent transactions. Therefore, the mobile incentive service could enable supplemental methods of acquiring the participant's voice data. For example, if during registration the mobile controller 158 determines that the current phone connection is too poor for an accurate voice sample capture, the participant could be requested to call back from a location with a stronger signal. Alternatively, the participant could be provided with an activation phone number and a password to use from a different phone, such as a landline. This would allow the participant to call in from a landline phone, which typically does not have the same variable sound quality issues as a mobile phone. Because the phone used to call is not the mobile device 138, the participant could identify his account and verify himself by providing a registered password.

Once a participant has enrolled with the mobile incentive service and activated his account, he can begin receiving mobile incentives via his mobile device 138. As aforementioned, during enrollment, or during a subsequent update of a mobile incentive account, a participant could specify the preferred method of delivery for his mobile incentives, such as automatically, per his request, or both.

Automatic Mobile Incentives Distribution

Figure 6:
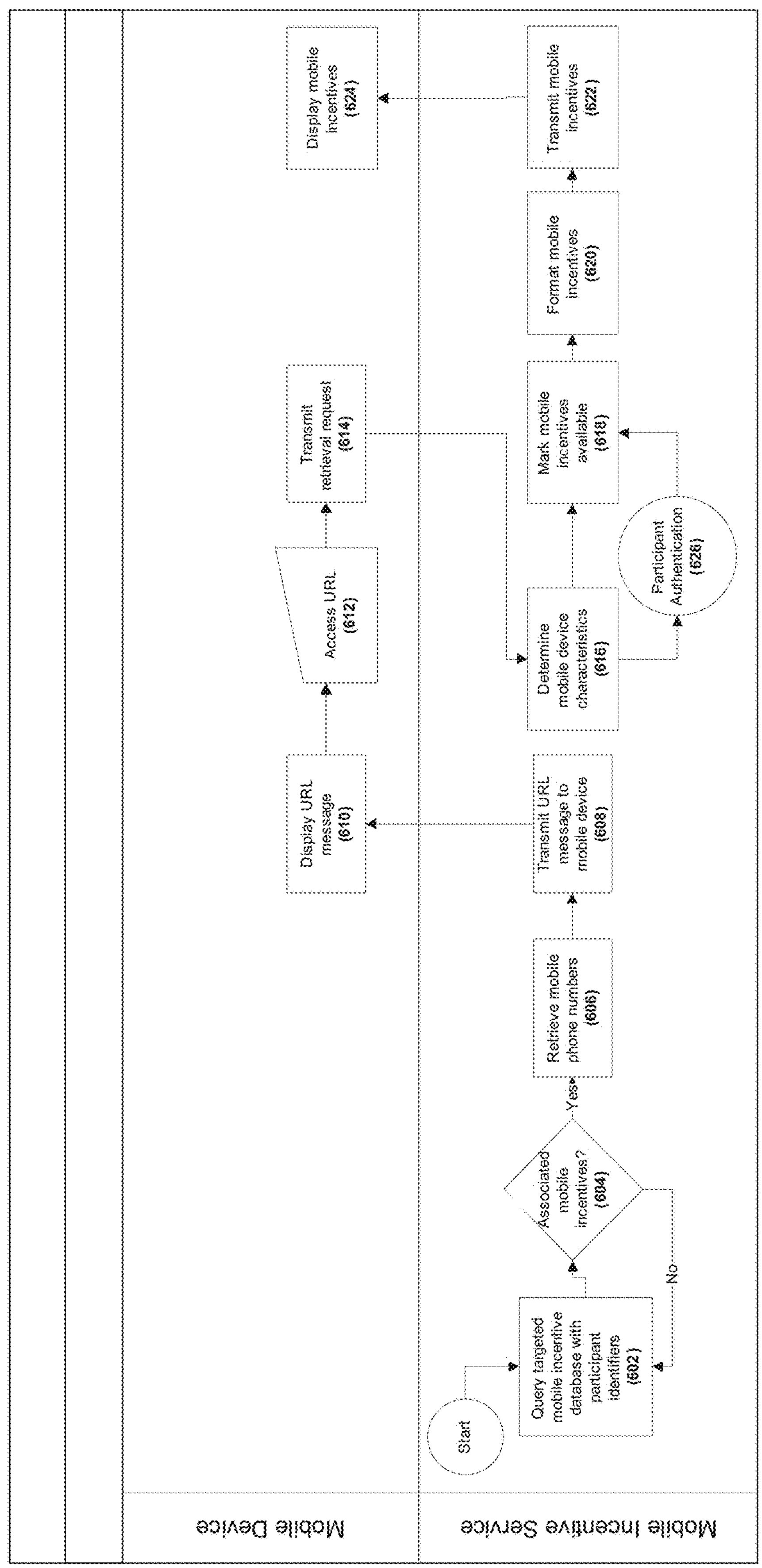
FIG. 6 depicts a flowchart of a process of distributing mobile incentives per an automatic process.

As previously discussed in the context of FIG. 1, the product provider subcomponent 106 can regularly and continually feed relevant data to the targeting engine data warehouse 122 and product providers can regularly generate mobile incentive pools (e.g., through the campaign manager 118) that are transmitted to the targeting engine 124 in order to create targeted mobile incentives that are stored in the targeted mobile incentives database 128. FIG. 6 depicts a flowchart of a process by which the mobile incentive service can distribute mobile incentives to a mobile device 138 automatically. The targeted mobile incentives server 126 can maintain a registry of participant identifiers for participants that have opted to receive mobile incentives automatically. The participant identifier registry can be categorized into various batches, such as by date, by demographic, or the like. For example, a group of participant identifiers could be grouped in a batch by the participants' preferred day of mobile incentive delivery, such as Monday. Similarly, a group of participant identifiers could be grouped into a batch based upon the age of the associated participant, such as participants between eighteen- and thirty-years old. Furthermore, a participant identifier can be associated with multiple batches. For example, a participant identifier associated with a twenty-year-old participant whose mobile incentive account indicates a preferred delivery day is Monday could be included with both of the aforementioned batches. Periodically, the targeted mobile incentives server 126 can query the targeted mobile incentives database 128 based upon one or more of these batches (step 602). For example, if a participant identifier batch is for participants that have chosen to receive mobile incentives on Monday, the targeted mobile incentives server 126 can query the targeted mobile incentives database 128 every Monday.

The targeted mobile incentives server 126 can then determine if any mobile incentives in the targeted mobile incentives database 128 are associated with the participant identifiers contained with the batch (step 604). As aforementioned, in addition to mobile incentives targeted to particular participants, the targeted mobile incentives database 126 could contain special promotion mobile incentives that can be distributed to a participant regardless of the batch type. For example, the targeted mobile incentives database 126 could contain a mobile incentive for a limited-time discount at the Olive Garden and could distribute this mobile incentive to any participants scheduled to receive a mobile incentive within the time limit. Once the targeted mobile incentives server 126 locates mobile incentives associated with the batch (including special promotion mobile incentives), it can create a list of participant identifiers associated with the mobile incentives and transmits this list to the MIMS controller 130. Utilizing the participant identifiers, the MIMS controller 130 can obtain the associated device identifiers, typically mobile phone numbers, from the device registration database 134 (step 606). In one embodiment, if device capability information is registered, the MIMS controller 130 can obtain this as well. The MIMS controller 130 can then transmit the device information to the mobile controller 158, which in turn can prompt the appropriate gateway 162, 168 (e.g., as indicated by the device capability information) to transmit a message, such as a WAP Push or SMS containing a URL, to the associated mobile devices 138 (step 608).

The participant can receive the message on his mobile device 138, which can display it to inform him that the mobile incentive service has mobile incentives ready for his perusal (step 610). The participant can access the URL by selecting the link on a WAP Push page or extracting the URL from an SMS message (step 612), causing the mobile device 138 to transmit a retrieval request to mobile server 102 (step 614) where it is received by the WAP gateway 168 or the messaging gateway 162. A retrieval request can include a device identifier (e.g., the mobile phone number), and device information. The retrieval request can be routed to the mobile controller 158, which, if the capabilities of the mobile device 138 have not yet been determined, can cross-reference the device information with data stored in the device manager 166 (step 616). Additionally, the mobile controller 158 can transmit the device identifier to the MIMS controller 130, which can obtain the corresponding participant identifier from the device registration database 134. As aforementioned, if the participant identifier is the same as the device identifier, this step can be omitted. Optionally, the MIMS controller 130 could relay the participant identifier to the authentication server 136 and initiate a participant authentication process, such as the one depicted in FIG. 8. In other embodiments, the MIMS 100 could be configured not to authenticate the participant at this point and such a process could be omitted. The MIMS controller 130 can then relay the participant identifier to the targeted mobile incentives server 126, which can query the targeted mobile incentives database 128 and obtain the participant's targeted mobile incentives. Once the targeted mobile incentives server 126 has obtained the participant's mobile incentives, it can mark them as available, and transmit them to the MIMS controller 130 (step 618). The targeted mobile incentives server 126 can maintain of registry of available mobile incentives per the associated participant identifier.

The MIMS controller 130 can transmit the mobile incentives to the mobile controller 158 and they can be then formatted per the characteristics of the mobile device 138 (step 620). The formatted mobile incentives can then be transmitted to the participant's mobile device 138 (step 622) where the participant can view them via the display of the mobile device 138 (step 624). If the promotion data of the mobile incentives includes only advertising data, no further action need be taken by the participant. If the promotion data of the mobile incentives includes an offer, in one embodiment, all the incentives made available are ready for use and the participant need not take further action. In another embodiment, the participant can indicate the particular incentives he wishes to use. For example, the participant could scroll through the incentives presented to him and use a button to select those of interest. The mobile device 138 can then relay which incentives were selected, indicating to the targeted mobile incentives server 128 which ones are to be kept associated with his participant identifier. Incentives not selected are not marked ready for use and can remain associated with the participant identifier or can be disassociated with the participant identifier, and therefore no longer available to the participant. Furthermore, mobile incentives not selected for use can be purged from the targeted mobile incentives server 128 after a specified time period (e.g., an incentive could be removed after it has expired). In one scenario, a participant could actively indicate those that are not of interest to him, causing them to be purged. The targeted mobile incentives controller 138, or another MIMS component, can log which incentives are not used. This data can be used by operators of the MIMS 100 to refine their targeting process (e.g., those of the targeting engine 124) and/or could be shared with product providers so that they can refine their incentive strategies.

Once the mobile incentives are ready for use, the participant may proceed to use the mobile incentives at the associated product providers.

Mobile Incentives Distribution Per Participant Request

Figure 7:
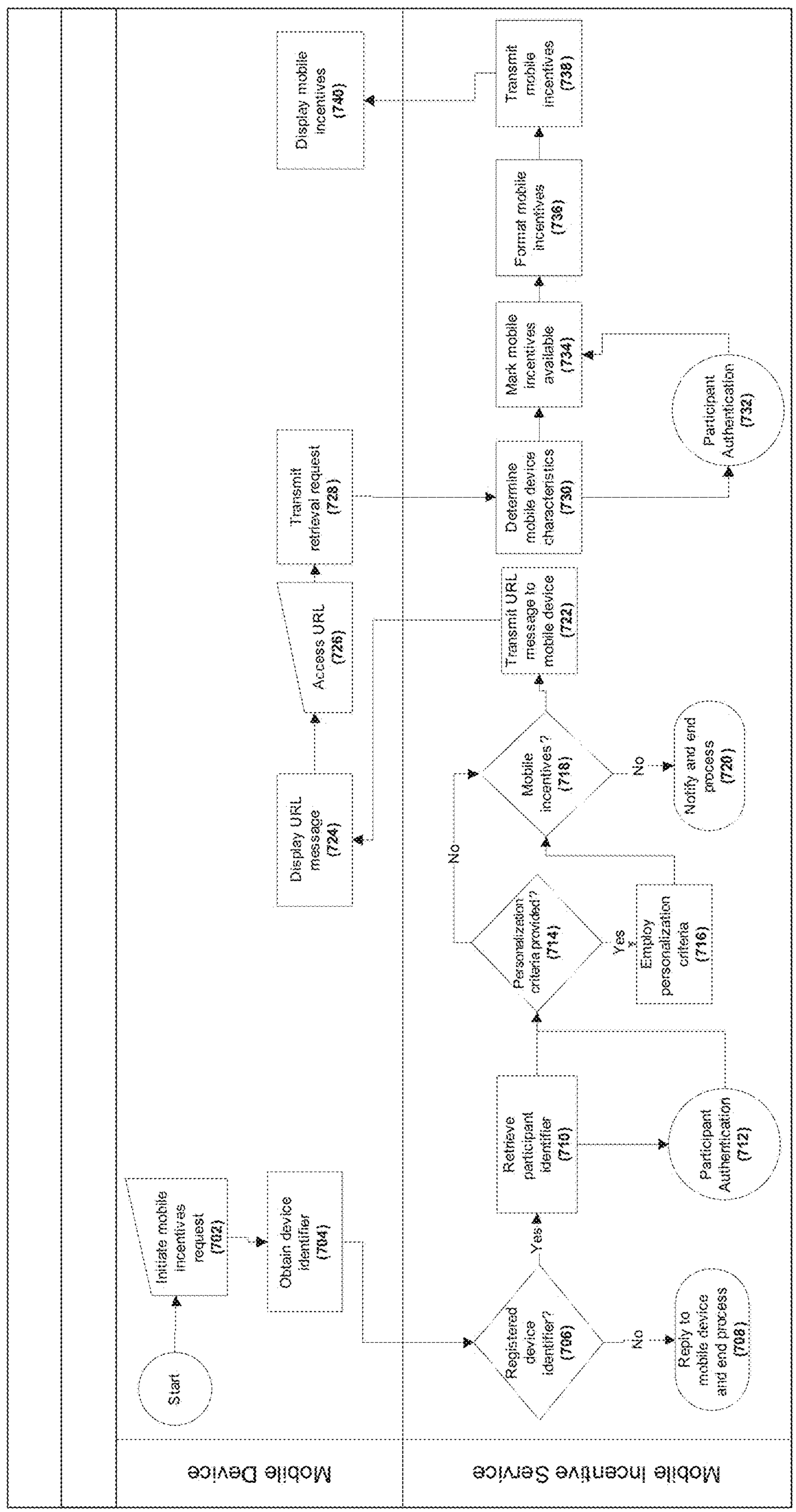
FIG. 7 depicts a flowchart of a process of distributing mobile incentives per an individual's request for a mobile incentive.

FIG. 7 depicts a flowchart of an embodiment in which a participant can actively request mobile incentives. A participant can initiate a mobile incentive request by contacting the mobile incentive service via his mobile device 138 (step 702). The participant can initiate a mobile incentive request via voice communication, by sending a text message, via an email, or the like. Furthermore, the participant's mobile device 138 could contain an application, such as a web browser, storing a mobile incentive "bookmark," which the participant can select to initiate a request. Furthermore, if the mobile device has a web browser, the participant could enter the URL for the mobile incentive service. In one embodiment, a participant could provide one or more keywords with his mobile incentive request. A keyword can be a word or phrase relevant to the desired goods or service (e.g., "coffee"), the product provider (e.g., "Starbucks") or the brand (e.g., "Folgers"). Furthermore, a keyword could indicate a particular region (e.g., a postal code, a county name, a shopping mall name, etc.) or could indicate a time frame (e.g., a day or a time of day). For example, a participant could be shopping in a particular merchant district and could provide the district's name as a keyword in order to learn what mobile incentives are currently available for stores in the area. If the participant is placing his request via a voice channel connection, he could speak the keyword or enter it via DTMF. In another embodiment, the participant need not provide a keyword, but can rather request mobile incentives per his established settings (e.g., rather than waiting for a scheduled delivery). In embodiments employing biometric data, the participant could provide his biometric data with his initial request. In embodiments utilizing voice communication for both keyword input and biometric data, the participant could provide biometric data (i.e., a voice sample) and keyword information simultaneously. For example, a spoken keyword could be used as a voice sample for biometric data extraction and could also be converted (e.g., via ASR technology) into a data message containing the keyword information. In embodiments employing keywords and another biometric type, such as fingerprint data, the participant could also provide his biometric data with his initial request, which could be received by the data application gateway 164, while the keyword could be received by another appropriate gateway (e.g., voice gateway 160, messaging gateway 162, etc.).

The participant's mobile incentive request can be sent via the carrier network 132 to the mobile server 102, where the request is received by the appropriate gateway 160, 162, 164, 168. For example, mobile incentive requests sent via a voice channel connection can be received by the voice gateway 160, those sent via a text message by the messaging gateway 162, and email requests or those communicated via an application on the mobile device 138 can be received by the data application gateway 164. Furthermore, biometric data, including a data message based upon a biometric sample converted via a mobile device 138 application, could also be received by data application gateway 164. When the appropriate gateway 160, 162, 164, 168 receives the request, it can obtain a device identifier and, in one embodiment, device capability information (step 704). For example, the voice gateway 160 or messaging gateway 162 can use caller ID functionality to acquire the mobile phone number of the incoming transmission or the data application gateway 164 can capture the sender's email address from the message.

Optionally, other information about the request, such as the date and time it was placed can be also received. Once the appropriate gateway 160, 162, 164, 168 has obtained the device identifier, the gateway 160, 162, 164, 168 can route the device identifier to the mobile controller 158, which in turn can relay it to the MIMS controller 130.

The MIMS controller 130 can query the device registration database 134 to determine if the device identifier is associated with a registered mobile device 138 (step 706). If not, the MIMS controller 130 can prompt the mobile controller 158 to send an error message to the mobile device 138 and may end the process (step 708). Optionally, the individual could be prompted to enroll. If the MIMS controller 130 can determine that the obtained device identifier is associated with a registered mobile device 138, it may retrieve the associated participant identifier (step 710) (If the participant identifier and the device identifier are one in the same, this step can be omitted). Depending upon the requirements of the mobile incentive service, once the participant has been identified, the MIMS 100 can begin mobile incentive discovery. In other embodiments, the mobile incentive service could initiate an authentication procedure (step 712), such as the authentication procedure illustrated by FIG. 8

Once a participant identifier has been located and, optionally, the participant has been authenticated, the system can continue with the mobile incentive process. The MIMS controller 130 can determine if the participant has provided one or more particular personalization criterion (step 714). For example, a participant may not be requesting a particular mobile incentive (and therefore has not provided personalization criteria) but rather could be requesting to be provided with any mobile incentives. If no personalization criterion has been provided, the process can continue as described below (i.e., step 718). Alternatively, if the participant has requested particular mobile incentives rather than all of those available to him, the MIMS controller 130 can transmit the located participant identifier and any personalization criterion it may have to the targeted mobile incentives server 126.

One example of a personalization criterion is location information. For instance, a participant could request mobile incentives based upon a particular geographical location. If a location keyword has been provided, such as a postal code, the targeted mobile incentives server 126 can relay this information to the product provider locator application 148, which can query the targeting engine data warehouse 122 via the keyword to search for corresponding product providers. For example, if the participant provided a postal code, the product provider locator application 148 can retrieve product provider identifiers for product providers within that postal code. Alternatively, or additionally, the product provider locator application 148 can query one or more location services 152 to determine the location of the mobile device 138. A location service 152 can be, for example, a mobile carrier that uses one or more methods to determine the location of the mobile device 138, such as via triangulation or via global positioning system ("GPS") functionality. In another embodiment, the product provider locator application 148 may utilize other mechanisms to determine the location of the participant. For example, if the participant recently authenticated himself at a networked device, such as a POT 104, a portal 156 (e.g., a kiosk), or the like, the product provider locator application 148 can determine the location of the networked device. Once the location service 152 has determined the location of the mobile device 138 (or the networked device), the product provider locator application 148 can query the targeting engine data warehouse 122 and retrieve product provider identifiers of corresponding locations. In one embodiment, if the participant has authorized the mobile incentive service to locate him via his mobile device 138, the participant could passively request mobile incentives based upon his location (rather than actively initiating a particular request). The participant could activate mobile incentive service tracking by initiating a mobile device application, by sending a message to the mobile incentive service, or the like, or such functionality could be automatically enabled once a participant activates his mobile device 138. The product provider locator application 148 can then prompt the location service 152 to monitor the location of the mobile device 138 (e.g., constantly or periodically) to determine the current location of the mobile device 138. When the location service 152 detects that the mobile device 138 is in a new location, it can share this information with the product provider locator application 148 (which can then determine if there are any corresponding product provider identifiers within the targeting engine data warehouse 122). In addition to monitoring the participant's location, the mobile incentive service, if authorized to do so, could also monitor other behavioral triggers to determine if the participant is eligible for a mobile incentive. For example, if a participant leaves a location associated with an available mobile incentive without using it, the mobile incentives service could send a reminder. Due to privacy concerns, a participant could be required to authorize location tracking services before the mobile incentive service can employ them. A participant's registered preferences could indicate he has authorized the mobile incentive service to do so or the participant could provide authorization via a particular mobile incentive request. Once the product provider locator application 148 has retrieved the product provider identifiers corresponding with the location data (e.g., the participant's location keyword or the location of the mobile device 138 as determined by a location service 152), it can share these with the targeted mobile incentives server 126, which can then utilize them as personalization criteria. If the product provider locator application 148 cannot locate any corresponding product provider identifiers, it can indicate this to the targeted mobile incentives server 126. In one scenario, the targeted mobile incentives server 126 could prompt the MIMS controller 130 to request further location information from the participant.

Once the targeted mobile incentives server 126 has received the personalization criteria, it can employ this information when searching the targeted mobile incentives database 128 (step 716). The targeted mobile incentives server 126 can determine if there are any mobile incentives associated with the participant identifier, and if provided, with the personalization criteria (step 718). For example, the targeted mobile incentives server 126 can search the targeted mobile incentives database 128 for mobile incentives associated with the participant identifier that correspond with a received keyword or with product provider identifiers obtained by the product provider locator application 148. In one embodiment, the targeted mobile incentives server 126 can also determine if there are any special promotion mobile incentives (see above) within the targeted mobile incentives database 128. If the targeted mobile incentives server 126 cannot locate an appropriate mobile incentive, it can notify the MIMS controller 130 (which in turn can prompt the mobile controller 158 to notify the participant that no suitable mobile incentives can be located) (step 720). If the targeted mobile incentives server 126 has located one or more mobile incentives, it can indicate this to the MIMS controller 130. The MIMS controller 130 can prompt the mobile controller 158, which in turn may prompt the mobile gateway 168, to transmit a message particular to the requested mobile incentives, such as a WAP Push page or SMS containing a URL, to the mobile device 138 associated with the participant identifier (step 722).

The participant can receive the message on his mobile device 138, which can displays it to inform him that the mobile incentive service has found mobile incentives per his request (step 724). The participant can access the URL by selecting the link in a WAP Push page or extracting the URL from an SMS message (step 726), which may transmit a retrieval request to mobile server 102 (step 728) where it is received by the WAP gateway 168 or the messaging gateway 162. The mobile controller 158 can employ the retrieval request information to determine the characteristics of the mobile device 138 via data stored with the device manager 166 (step 730). Additionally, the mobile controller 158 can transmit the retrieval request to the MIMS controller 130, which utilizes the device identifier to determine the appropriate participant identifier. Optionally, the MIMS controller 130 could relay the participant identifier associated with the retrieval request to the authentication server 136 and initiate a participant authentication process, such as the one depicted in FIG. 8 (step 732). The MIMS controller 130 may then prompt the targeted mobile incentives server 126 to obtain the requested mobile incentives associated with the participant identifier. The targeted mobile incentives server 126 can obtain the requested mobile incentives, mark them as available (step 734), and relay them to the MIMS controller 130, which can transmit them to the mobile controller 158. The targeted mobile incentives server 126 can maintain of registry of available mobile incentives per the associated participant identifier. The mobile incentives can then be formatted by the mobile controller 158 per the characteristics of the mobile device 138, as determined by the device manager 166 (step 736). The formatted mobile incentives can then be transmitted to the participant's mobile device 138 (step 738) where the participant can view them via the display of the mobile device 138 (step 740). In one embodiment, rather than waiting for a retrieval request, requested mobile incentives are transmitted to the mobile device once they are located. That is, steps 722 to 730 (and optionally step 732) could be omitted and the mobile controller 158 could format the mobile incentives per device capability information received with the initial mobile incentive request. As described in relation to mobile incentives offers distributed automatically, all the requested mobile incentive offers made available could be ready for use or the participant could indicate the particular offers he wishes to use. Similarly, the MIMS 100 could log which requested mobile incentives are not selected.

For both automatic distribution and distribution by request, the manner in which mobile incentives are displayed on the mobile device 138 could vary per implementation. In one scenario, if a WAP page is used, the participant could be presented with a list of icons for products and/or product providers. The participant can then scroll through the list and select an icon to view more details. In one embodiment, if restricted mobile incentives were provided (e.g., age-restricted or those of a personal nature), a participant could be required to undergo authentication, such as the process described in relation to FIG. 8, to access them (although he may not need to do so in order to view other, unrestricted mobile incentives). If the icon selected is for a product provider, the mobile device 138 could then display mobile incentives for that product provider as well as directions to the product provider location. If the participant has authorized the mobile incentive service to track his mobile device 138, an application could guide him to the appropriate location and, if such data is available, to the product's position within the location. If the participant has requested mobile incentives per specific criteria, they could be displayed in order of relevancy to the criteria. In another scenario, the display order could be determined by a service fee the associated product providers pay to the mobile incentive service. Those who pay a higher service fee could have their mobile incentives displayed more prominently than those who pay a lower service fee. Additionally, to encourage participants to view available mobile incentives, the mobile incentive service could reward participants for each mobile incentive they review. This could be particularly beneficial as a way to entice participants to receive and review advertisement-only mobile incentives. A participant could earn a reward point by the mobile incentive service for each mobile incentive he selects to review and receive a reward (e.g., a particularly valuable offer, a one-time discount at any participating product provider, etc.) once he has accumulated sufficient points. As aforementioned, a participant may undergo authentication in order to access his mobile incentives. Such authentication may deter unscrupulous individuals from attempting to exploit the mobile service via a "click fraud" scheme in which they create accounts solely for the purposes of generating reward points. For example, biometric authentication can prevent an individual from creating multiple incentive accounts in order to obtain an inordinate amount of reward points. In one embodiment, rather than, or in addition to, providing mobile incentives via a visual display on the mobile device 138, mobile incentive information could be provided to the participant in an audio format via the speaker of his mobile device 138. If need be, the participant could employ a voice interface, DTMF, or the like to review the various information provided.

Participant Authentication Via a Mobile Device

As mentioned, there are several places throughout the aforementioned processes in which participant authentication could be utilized. In particular, participant authentication can be employed when a precise determination of the identity of the participant involved would be useful. For example, participant authentication can be used to ensure that the mobile incentive service is accurately identifying who is requesting mobile incentives, who is viewing mobile incentives, and/or who is utilizing mobile incentives. The particulars of system implementation could determine the timing, frequency, and type of authentication utilized. For example, a mobile incentive service could require participant authentication prior to the viewing and/or selection of all mobile incentives or only for those of a personal or age-restricted nature. In another scenario, a mobile incentive service could determine that authentication may only be required when they are to be used.

Figure 8:
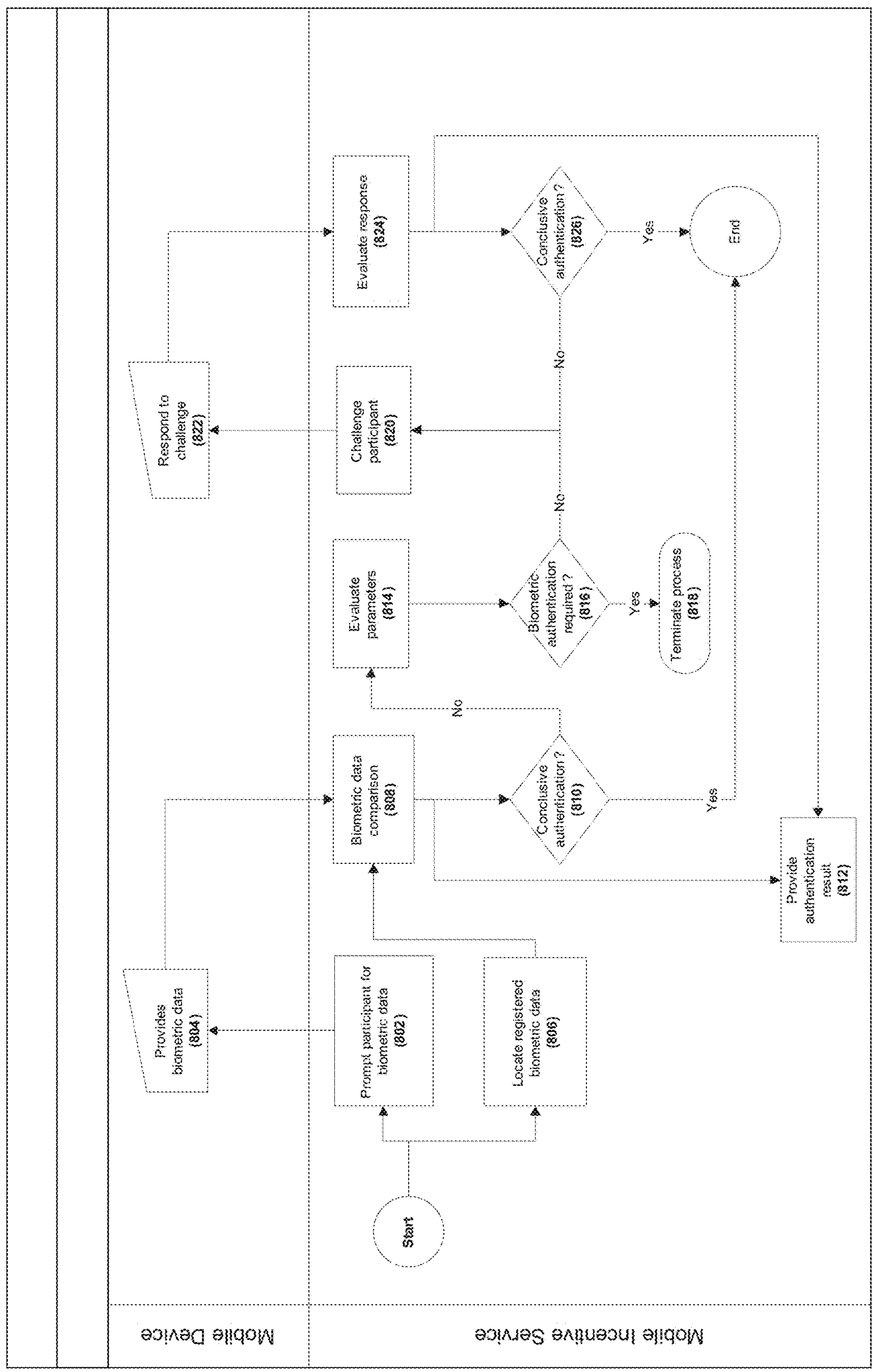
FIG. 8 depicts a flowchart of a process wherein an individual undergoes authentication via a mobile device.

FIG. 8 depicts a method of participant authentication via a mobile device 138 and could be used at various points in the processes previously described. The authentication procedure depicted in FIG. 8 and described herein is not to be construed as limiting, as other authentication procedures could also be utilized. Once the MIMS controller 130 has located a participant identifier, it can instruct the mobile controller 158 to prompt the participant for biometric data (step 802). For example, the participant could be prompted to speak a particular word or phrase that is to be used as for biometric authentication. If the biometric authentication procedure is to utilize voice data and a voice channel connection is not currently established with the participant's mobile device 138, one can be established. For example, if the participant initiated a mobile incentive request via a text message, the mobile controller 158 could trigger the voice gateway 160 to call the mobile device 138 or provoke the messaging gateway 162 to send a text message to the mobile device 138 requesting the participant call a service number. For biometric data types other than voice data, or if voice data is converted into a data message before transmission, a voice channel connection need not be established. Once prompted, the participant can provide the requested biometric data via his mobile device 138 (step 804). As mentioned, in some embodiments, a participant can provide his biometric data with an initial communication to the mobile incentive service, such as during a mobile incentive request (i.e., step 702), rather than waiting to be prompted.

The MIMS controller 130 can instruct the authentication server 136 to retrieve registered biometric data associated with the participant identifier (step 806). If more than one participant is registered for the mobile device 138 (i.e., more than one participant identifier is associated with it), the authentication server 136 can retrieve biometric data associated with each of the participant identifiers. Once the participant has provided biometric data via his mobile device 138, the biometric data can be routed to the authentication server 136, which can then compare the registered biometric data with the newly received biometric data (step 808). For example, the authentication server 136 can compare biometric data extracted from a provided voice sample with registered biometric data stored in the biometric database 144. Once the authentication server 136 has performed the comparison, it can evaluate the results to determine if the comparison authenticates the participant's identity (step 810). In general, received biometric data is considered to match registered biometric data if the data sets are sufficiently similar (i.e., they need not be identical). For example, once the authentication server 136 compares the received biometric data with stored biometric data, it can generate a result score indicative of the similarity of the data sets. If the result score meets the required matching threshold, the comparison can be considered successful.

Once the authentication server 136 has performed its determination, it can share this information with the MIMS controller 130, which in turn can prompt the mobile controller 158 to provide the participant with the authentication result (step 812). If the authentication was successful, the participant can be advised of this and the mobile incentive process can continue. If the biometric comparison clearly indicates that the individual attempting the mobile incentive request is not authorized to do so (i.e., is not associated with the mobile device 138), the process could terminate. However, if the biometric comparison yields an inconclusive result, the authentication server 136 could query the MIMS controller 130 to determine if an additional authentication process can be initiated. An inconclusive result can be, for example, one in which the result of a biometric comparison does not meet a biometric matching threshold, but is not low enough to indicate unmistakably that individual is not the correct participant. The MIMS controller 130 can evaluate established parameters (step 814) to determine if a non-biometric authentication procedure can be initiated (step 816). The parameters evaluated could be based upon preferences established by the participant, the product provider, or the mobile incentive service itself. For example, the mobile incentive service could establish a parameter that indicates that a participant failing authentication within 10% of the desired threshold can be allowed to undergo non-biometric authentication. In another scenario, the mobile incentive service could establish a parameter indicating that any participant attempting to access an age-restricted mobile incentive is forbidden access if biometric authentication does not yield a clear result. Alternatively, biometric comparison could be used mainly for convenience, rather than for security, and a non-biometric authentication procedure could be initiated whenever biometric comparison fails. In another scenario, biometric authentication could be omitted completely, such as if information associated with a participant identifier indicates that the participant's biometric data is non-viable (e.g., a sufficient voice sample could not be obtained during enrollment or the participant is an elderly person with a fingerprint too weak for a successful scan).

If the MIMS controller 130 determines that biometric authentication is required for the requested mobile incentive (s), the mobile incentive request process can terminate (step 818). If the MIMS controller 130 determines that an alternate form of authentication is acceptable, it can initiate a challenge and response authentication procedure. The authentication server 136 can access one or more elements of verification data stored in association with the participant identifier in the knowledge database 146 and the MIMS controller 130 can prompt the mobile controller 158 to challenge the participant based upon such data (step 820). The challenge and response session can occur via the current communication method being utilized between the mobile server 102 and the mobile device 138 or a new communication method could be initiated. For example, if a voice channel connection is already established between the mobile device 138 and the mobile server 102, the challenge and response session can occur via the voice channel connection or, if the participant previously communicated with the mobile server 102 via text messaging, the mobile server 102 could establish a voice channel connection. The participant can provide his response(s) to the challenge via mechanisms appropriate for the communication utilized, such as ASR, IVR, or DTMF for a voice channel (step 822). The participant's response can be relayed to the authentication server 136, which can evaluate the response (step 824) to determine if it sufficiently corresponds with the issued challenge and conclusively authenticates the participant (step 826). As with the biometric authentication, the authentication result can be provided to the participant (step 812). If the result is inconclusive, the process could end or another challenge and response session could occur. The amount of authentication attempts allowed can be established by the mobile incentive service and could vary per the type of mobile incentive(s) to be provided (e.g., age-restricted or not). Once the participant has been authenticated successfully, the process can continue.

Mobile Incentive Use

Figure 9:
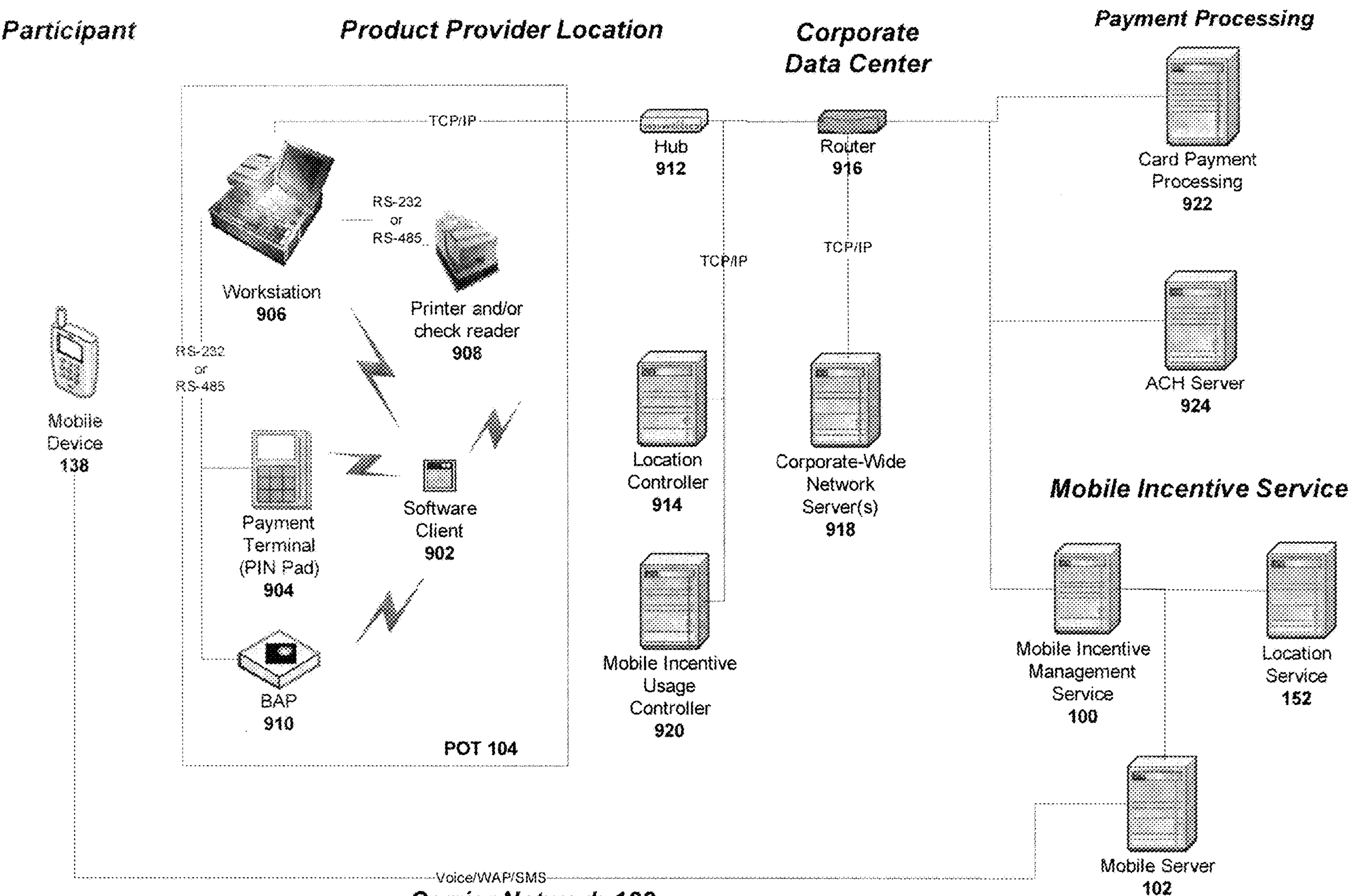
FIG. 9 depicts a product provider infrastructure architecture with which a mobile incentive service can be utilized.

FIG. 9 depicts one embodiment of an infrastructure architecture for using mobile incentives at a product provider location in which the present invention may be deployed. The following description describes mobile incentives mainly in terms of the use of mobile incentives associated with an offer that can be redeemed at a product provider location, however this is not to be construed as limiting. As previously mentioned, a mobile incentive may include advertisement data unassociated with a particular offer. Although the location is generally described herein in terms of a merchant location (e.g., a POS), this is not to be construed as limiting. Mobile incentive use could occur at various types of product provider locations and, therefore, the components illustrated could be substituted or omitted as appropriate for the particular product provider. A product provider's POT 104 can include a workstation 906, such as an electronic cash register, that is coupled to a payment terminal 904 (such as a PIN pad), which is further coupled to a BAP 910. In addition to providing a biometric scanner, the BAP 910 can also contain a processor, memory, and software in order to control biometric image capture at the biometric scanner as well as a drive to respond to communication from the payment terminal 904 or the MIMS 100. The workstation 906 could be further coupled to other peripheral devices such as a printer or check reader 908 that provides further functionality. Both the workstation 906 and the BAP 910 (and the other BAP and workstations for other POT stations if the product provider has multiple POT stations, such as in a supermarket) can be further coupled through a hub 912 to the product provider's specific location controller 914 and an mobile incentive usage controller 920 (as further described in conjunction with FIG. 10). Typically, a software client 902 embedded within the POT 104 gathers data during transactions, such as product information, purchase amount, participant authentication data (e.g., a password, a phone number, biometric data, an account number, loyalty program information, membership program information, a personal number, or the like), and can communicate with the mobile incentive usage controller 920, the corporate-wide network server 918, the MIMS 100, and the like in order to transmit, request, and/or receive data. For example, the software client 902 can query the mobile incentive usage controller 920 when a participant has chosen to use a mobile incentive at the POT 104. The software client 902 can reside within any of the aforementioned POT 104 components or another product provider-specific component such as 914 or 918, as would be determined by the particular configuration and implementation. For example and without limitation, in one embodiment, the software client 902 can reside in the payment terminal 904 which serves as the component in the POT 104 that initiates communication with the MIMS 100. Alternatively, the software client 902 can reside in the corporate-wide network server 918 that manages communication between the MIMS 100 and the mobile incentive usage controller 920 or the POT 104. Those with ordinary skill in the art will recognize that the software client 902 can be divided into separate sub-components and may reside in multiple portions of the aforementioned product provider components.

Figure 10:
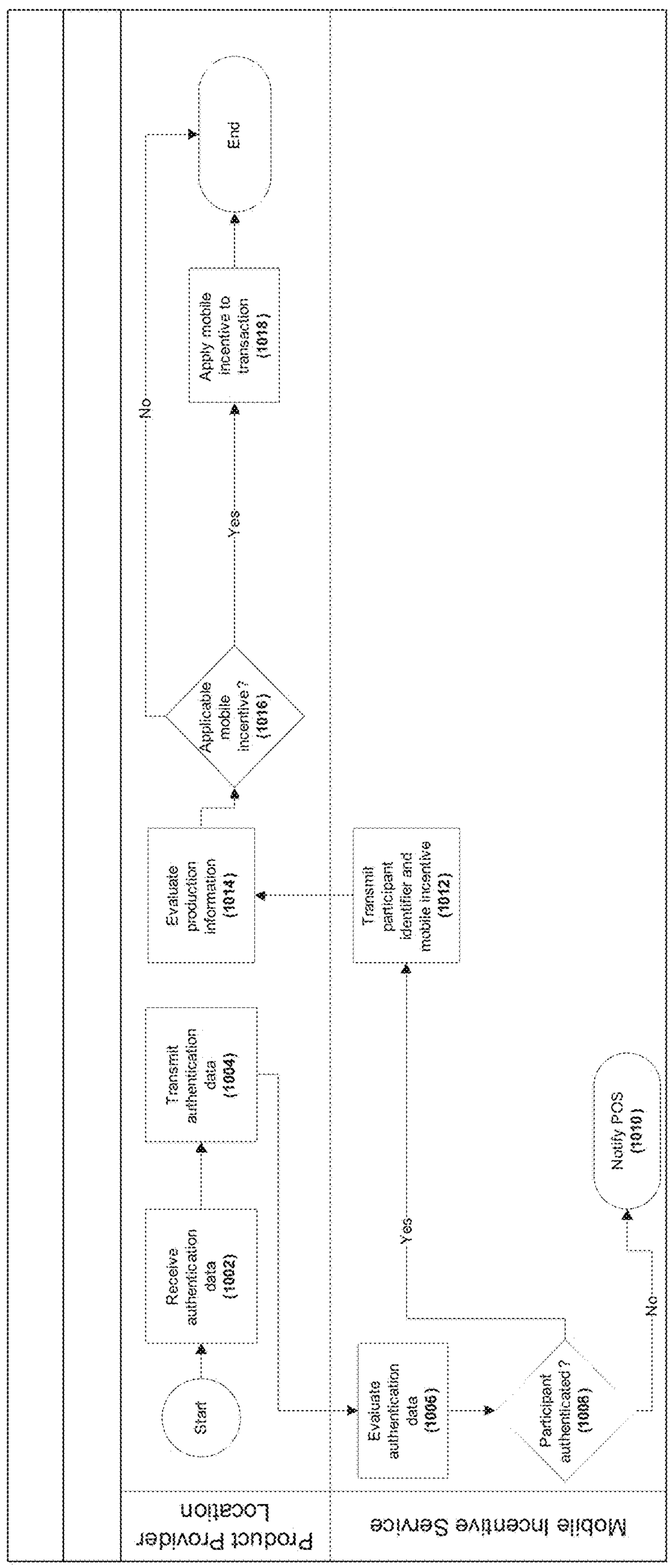
FIG. 10 depicts a flowchart of a process for mobile incentive use at a point of transaction.

The workstation 906 can be configured or customized to communicate with the mobile incentive usage controller 920 as further described in relation to FIG. 10. The hub 912 can be further coupled to the product provider's corporate-wide network server 918. The corporate-wide network server 918 can be further coupled to a router 916 which can be further coupled to payment processing services for credit or debit card transactions 922 or for Automated Clearing House ("ACH") transactions 924. For example, the POT 104 could receive financial account information from the participant's electronic wallet (e.g., stored in the electronic wallet database 142), which could then be relayed onto the appropriate payment processing service. Such a configuration could be particularly convenient as it could allow a participant to access both his mobile incentives and financial account data by way of a single authentication at the POT 104. The corporate-wide network server 918 can also be further coupled to the MIMS 100. Additionally, the mobile incentive usage controller can be connected to the hub 912 and router 916, and ultimately to the MIMS 100.

Those of ordinary skill in the art will recognize that the various communication channels and computer systems depicted in FIG. 9 may be implemented in a variety of known techniques and manners. For example, while the mobile incentive usage controller 920 is illustrated as being coupled to the product provider's network hub 912, in certain embodiments, the mobile incentive usage controller 920 can possess its own direct communication channel to the MIMS 100 that is separate from the product provider network. With respect to network connections, rather than using dedicated TCP/IP connections between the corporate-wide network server 918 and the MIMS 100 and other payment processors 922 and 924, Internet connections may be considered in alternative embodiments. Similarly, rather than having the payment terminal 904 or the BAP 910 communicate with the MIMS 100 through a wired network, alternative embodiments may utilize a wireless network system. Similarly, if the product provider's computer network supports wireless networking technology, the workstation 906 may communicate with the location controller 914 wirelessly. As those of ordinary skill in the art will recognize, the communication among the product provider's POT 104, the location controller 914, the mobile incentive usage controller 920, the product provider's corporate-wide network server 918, various payment processing servers 922 and 924 and the MIMS 100 may be implemented through a variety of private or proprietary networked connections or through the Internet or other publicly accessible networks.

Those of ordinary skill in the art will recognize that the control logic and data stored and used by the various computer systems as described above is merely illustrative and may be distributed throughout the various computer systems' logic controls and databases in alternative but functionally equivalent designs, including without limitation, the removal of certain systems and addition of other systems, without departing from the scope or spirit of the described embodiments. For example, a biometric scanner device (without the additional processing, memory and software capabilities of a BAP 910) may be coupled directly to the workstation 906 and the logic for communication between the biometric scanner device and the MIMS 100 may be managed by the addition of another server coupled to the location controller 914 in the back of the product provider's location. An alternative embodiment, for example, for a smaller product provider, may not utilize a location controller 914 or have a corporate-wide network server 918. Furthermore, various elements of the present invention's functionality could occur external to the mobile incentive service and/or could be managed by a party other than the mobile incentive service itself. For example, a product provider's location controller 914 and/or its corporate-wide network server(s) 918 could handle functions previously described in relation to the MIMS 100.

FIG. 10 depicts a flowchart illustrating an example of mobile incentive use at a product provider location. When a participant wishes to use a mobile incentive, he can approach a POT 104 and provide authentication data at the POT 104 in order to use any mobile incentives made ready for use as described above (step 1002). The form of the authentication data can vary per the implementation of the invention and could be any data that would enable the MIMS 100 to locate the appropriate participant identifier. As aforementioned, authentication data could include a password, a phone number, biometric data, an account number, loyalty program information, membership program information, a personal number, or any other data with the participant has registered with the mobile incentive service. Furthermore, authentication data could be received from the participant directly or could be obtained from a card presented by the participant. In some embodiments, the participant could be allowed to choose which authentication data he provides (so long as the participating product provider has the appropriate equipment and allows the participant to do so). For example, a participant could key in his mobile phone number via the payment terminal 904, present an mobile incentive card (e.g., a card issued by the mobile incentive service containing participant authentication data) to be scanned or swiped (possibly via the payment terminal 904), or could provide biometric data (either live or obtained from a card or other device) via the BAP 910. A few examples of participant authentication at the POT 104 will now be described.

In one embodiment, the participant could place his finger on the BAP 910 of the POT 104 which could then capture and produce a representation of the image of the participant's fingerprint. Additionally, the participant could enter a personal number into the payment terminal 904 to provide further information in order to authenticate himself. A personal number can be an alphanumeric code associated with a participant's registered information used by the system to locate an element of such information. A personal number could contain elements of other participant information (e.g., a mobile phone number, a loyalty number) or could be independent of such data. The authentication data can be acquired by the software client 902 and transmitted to the MIMS controller 130 of the MIMS 100 (step 1004). For example, the software client 902 could transmit to the MIMS controller 130 the participant's biometric data and personal number. The MIMS controller 130 can relay the authentication data to the authentication server 136, which can then evaluate it (step 1006) to determine if there is an associated participant identifier and, therefore, the participant has an mobile incentive account (step 1008). For example, if the participant provides biometric data, the authentication server 136 receives the participant's biometric data (and personal number) and interacts with the biometric database 144 using known methods of comparing biometric information (and utilizing personal numbers) to confirm a successful biometric comparison.

In another embodiment, a participant could present his loyalty or membership card for the current product provider. The MIMS controller 130 can query a product provider subcomponent 106 to determine if the card number is registered within the client information database 108, and then can employ the associated participant identifier. The product provider subcomponent 106 could be indicated by a product provider identifier received from the POT 104.

In yet another embodiment, if the participant provides his mobile phone number, the MIMS controller 130 could determine if there is a corresponding number in the device registration database 134. As more than one participant could be registered for the same mobile device 138 (and therefore more than one participant could provide the same mobile phone number as authentication data), the participant could provide further information, such as a personal number, to specify the proper participant identifier.

In another embodiment, the MIMS 100 could perform a participant authentication similar to the process depicted in FIG. 8. For example, a personal number provided with biometric data could itself be associated with a participant identifier. Alternatively, if the participant identifier is known to the participant, he could provide it as a personal number. The MIMS 100 could utilize the personal number to locate his participant identifier (if need be), and then locate the participant's registered biometric data and/or verification data accordingly. The participant could then undergo authentication as described in steps 808 through 828, but interact with the MIMS 100 via the POT 104 rather than via his mobile device 138.

Once the authentication data has been evaluated, if the MIMS 100 determines that the information does not authenticate the participant, the POT 104 can be notified and the process may end (step 1010). In one embodiment, the participant could be prompted to re-enter his authentication data or provide a different type for another attempt. If the MIMS 100 determines that the authentication data authenticates the participant, the MIMS controller 130 can use the corresponding participant identifier to query the targeted mobile incentives server 126, which in turn can retrieve associated mobile incentives that have been made ready for use, such as during automatic mobile incentive distribution or per a participant-initiated request. Once the MIMS controller 130 has received the mobile incentives, it can transmit the participant identifier to POT 104 and the mobile incentive information (including the participant identifier) to the mobile incentive usage controller 920 located at the product provider (step 1012). When the product provider employee scans a product into the POT 104, the POT 104 can transmit the participant's identifier and product information (e.g., UPC code) to the mobile incentive usage controller 920 which can evaluate the product information (step 1014) to determine whether such a product applies to the participant's mobile incentives (step 1016). This can be done for each product, thereby enabling the participant to use any appropriate mobile incentives. The process can be done after each item is scanned or in a batch transmission once all the products have been entered. If the mobile incentive usage controller 920 identifies that a product is applicable, it can transmit the mobile incentive information to POT 104 where it can be applied to the current transaction (step 1018). For example, a mobile incentive for a percentage discount can reduce the price charged to the participant. In certain embodiments, participant use of mobile incentives is tracked by the mobile incentive usage controller 920 and can be transmitted back to the MIMS 100 for storage in the product provider subcomponent 106 and subsequent use for improved targeting by the targeting engine 124 and/or to provide reports to the product provider. In one embodiment wherein CPG mobile incentives are used by the participant at a merchant location, a report of such CPG uses may be generated by the MIMS 100 and transmitted to the merchant for use during settlement of funds between the merchant and the CPG.

Ultimately, payment information received by the POT 104 can be transmitted to a payment processor such as 922 and 924 for final payment authorization. As aforementioned, if the participant's mobile incentive account is associated with his electronic wallet, or if the mobile incentive account and electronic wallet are one in the same, payment information can be received once the participant has been authenticated. In addition to transmitting mobile incentive information to the POT 104, the MIMS 100 can provide financial account data from the participant's electronic wallet. This can enable the participant to pay for a transaction and apply mobile incentives to the transaction in a highly convenient manner. For example, if the participant undergoes biometric authentication at the POT 104, he may not supply any extraneous information from his mobile device 138, from a card, from his own memory, or the like, to provide mobile incentive and payment information, and thereby complete the transaction.

Those with ordinary skill in the art will recognize that alternative process flows may be implemented that do not depart from the spirit and scope of the foregoing disclosure.

For example, rather than transmitting the available mobile incentives to the mobile incentive usage controller 920 (i.e. step 1012), an alternative embodiment may transmit mobile incentives to the mobile incentive usage controller 920 when they are made ready of use. In yet another embodiment, the mobile incentive usage controller 920 may be bypassed in its entirety, with the mobile incentives being transmitted to the POT 104. In such an embodiment, the POT 104 may have the processing and memory capabilities to serve as a mobile incentive usage controller 920. In an alternate embodiment, rather than the mobile incentive usage controller 920 or the POT 104 evaluating product information with the participant's mobile incentives, the MIMS 100 could handle such functionality. Mobile incentive information need not be transferred to the product provider location, but rather could be held at the MIMS 100, such as in the MIMS controller 130 or the targeted mobile incentives server 126. In addition to, or instead of, performing an analysis of UPC information, the MIMS 100 could enable alternate means of evaluation. For example, textual data, such a product name, could be compared with textual data of a mobile incentive. Once the evaluation has been completed, the MIMS 100 could notify the POT 104 or the mobile incentive usage controller 920 which action, if any, should be taken at the POT 104. Alternatively, the POT 104 could process the transaction as normal, not accounting for any appropriate mobile incentives, and the MIMS 100 could handle the incentive usage separately. For example, if the MIMS 100 has access to the participant's financial account information (e.g., to his electronic wallet), it could credit an account with an amount reflective of the particulars of a mobile incentive (e.g., based upon a discount from a purchase price). Alternatively, the credit could be applied to a stored-value account associated with the MIMS 100. The participant could then use the stored-value at a subsequent purchase made via the MIMS 100. In one scenario, the stored-value account could be particular to the associated product provider. For example, if a participant received a stored-value credit due to a Best Buy mobile incentive, the credit could be usable only at Best Buy.

In one embodiment, the present invention can be utilized to track the effectiveness of advertisement-only mobile incentives in addition to, or instead, offer-based ones. As aforementioned, a mobile incentive that has been transmitted to the mobile device 138 can be associated with the participant's incentive account. Subsequent to this, the participant can undergo authentication at a POT 104. During or subsequent to the transaction, the software client 902 can send product and/or product provider information to the mobile incentive usage controller 920 and/or the MIMS controller 130. It can then be determined whether any mobile incentives associated with the participant's incentive account are associated with the received product and/or product information. By doing so, the effectiveness of an advertisement-only mobile incentive can be estimated. For example, the MIMS controller 130 can record the length of time between the delivery of the mobile incentive and the purchase of the associated product.

Mobile Incentive Usage Tracking

As previously discussed, the MIMS 100 can enable product providers to track incentive usage and collect participant behavioral data. Furthermore, collecting such data can enable the MIMS 100 to refine its targeting algorithms for associating incentives with participants and to supply product providers with detailed reports of participant behavior and analysis of product provider's transaction activity. As the delivery and/or usage of mobile incentives typically involves participant authentication, the product provider can be ensured that the participant targeted to receive a mobile incentive is the same individual that utilizes it. For example, a participant could be required to undergo biometric authentication at the POT 104 in order to use a mobile incentive, thereby ensuring that the individual making use of it is actually the targeted participant. The participant does not receive a code or other data which can be shared with another person, allowing that person to use the incentive instead of the participant, which would, in turn, provide an inaccurate sense of incentive usage.

In one embodiment, the MIMS 100 can provide a participating product provider with reports of mobile incentive usage and/or transaction data (e.g., through its receipt of transaction records through the product provider subcomponent 106). Such reports can include measures of client retention, information pertaining to client inventory (e.g., number of clients within different segments), information pertaining to client segmentations relating to sales, benchmark comparisons with other product providers within a chain, levels of participant identification, and the like, and can reflect total product provider chain measures, division or region measures, and/or individual product provider measures. Furthermore, such reports can include data particular to the usage, of lack thereof, of a mobile incentive. For example, a report could indicate whether a mobile incentive was used and, if so, the date and time, the location, the particulars of the participant, and the like. As another example, a report could indicate whether an advertisement-only mobile incentive enticed a participant to purchase the associated product or visit the associated product provider. Such information can allow the product provider to analyze the success of a mobile incentive and enable the product provider to adjust his targeting preferences manually and/or supplement them by extending relevant mobile incentives to specific participants that a report indicate may be receptive. Those with ordinary skill in the art will recognize that reports generated by the MIMS 100 can be delivered to product providers through a variety of distribution methods, including through the Internet (e.g., web reporting), allowing all authorized personnel to view them via a web browser, or through a periodic publication sent to the product provider on a regular basis (e.g., weekly, monthly, quarterly). Such reports may integrate various observable factors, such as viewing types of sales (such as sales within a specific product category) across different participant segments. As the system of the present invention enables product providers to be involved in mobile incentive creation and distribution as well as monitoring mobile incentive usage, the system of the present invention can provide product providers with a mechanism to monitor mobile incentives from creation, to distribution, and finally to usage.

In one embodiment, incentives could be transferred or shared between participants. When a participant views a mobile incentive, the display of his mobile device 138 could indicate that the incentive could be shared or transferred. For example, the display could present a link stating "Not interested? Know someone else who is?" or "Share the savings with a friend!" The participant could specify who to distribute the mobile incentive to by inputting an identifier for the other person, such as his mobile phone number. In one scenario, the mobile incentive could be relayed to more than one person, but the mobile incentive service or the associated product provider could establish a limit on such activity. Typically, only individuals enrolled with the MIMS 100 can participate. However, a non-enrolled person could receive a message, such as via email or as a test message, informing him that the participant wishes to share a mobile incentive with him and he may receive it if he enrolls in the system. As the MIMS 100 is enabling the relaying of the mobile incentive, it can still maintain an accurate record of its use. The MIMS 100 has a record of those involved and can log this information for its and/or the associated product provider's purposes. The MIMS 100 remains aware of who utilizes the incentive and who does not and this information could help with the refinement of mobile incentive targeting. For example, if the participant shared an incentive with another individual in the same target group, the mobile incentive could be deemed as on target. However, if the mobile incentive was shared with someone outside the target group, a new target group for the mobile incentive (or similar ones) can be ascertained.

Although the system of the present invention has been so far discussed in regards to providing participants with mobile incentives based upon information electronically stored by a product provider, this is not to be construed as limiting. In an alternate embodiment, a participant could be enabled to associate incentives from sources outside the MIMS 100, such as paper or electronic coupons, with his mobile incentive account. To do so, the participant could access the MIMS 100 via his mobile device 138 or a portal 156 and supply the necessary information. The participant could provide the name of the relevant product and/or a product provider, an incentive identifier (e.g., a UPC code), the related discount, or the like. The incentive could then be associated with the appropriate participant identifier and made ready for use. If the incentive is related to a product provider utilizing the MIMS 100, the received information could be confirmed with the product provider's records stored in the product provider subcomponent 106 or at an external source.

Although the present invention has been described with reference to the alternative embodiments, those of ordinary skill in the art will recognize that changes may be made in form and detail without departing from the spirit and scope of this disclosure. For example, the present invention has been described mainly with reference to analyzing information and creating targeted mobile incentives for an individual participant. However, those with ordinary skill in the art will recognize that the targeting engine 124 may analyze participant habits and present mobile incentives to participants based on a householding basis rather than on an individual basis. "Householding" as used herein refers generally to a method of consolidating or grouping information about any given person, family, household, company, friends, social network, or other identified group. Techniques to utilize household information as disclosed and taught in U.S. patent application Ser. No. 11/421,458, filed May 31, 2006, may be implemented in conjunction with the teachings herein. Similarly, while the present invention has primarily discussed mobile incentives in the form of discount offers to participants, other embodiments are possible and included herein. For example, a CPG may desire to determine which participants are the best to target for certain advertisements (as opposed to offers). As another example, the present invention could enable a healthcare service to distribute information or alerts to participants with certain health needs or conditions. In yet another example, a government agency could utilize the present invention to provide individuals with pertinent information, such as information regarding tax filings (e.g., that a refund has been sent), immigration benefits, or the like.

The present invention has also mainly been described with reference to a "bricks and mortar" product provider infrastructure as described in FIG. 9. However, those with ordinary skill in the art will recognize that other product provider channels such as, but not limited to, an online or e-commerce transaction architecture or a mobile device transactions architecture could also make use of the claimed invention (e.g., product provider-specific loyalty identification information could be tracked by the product provider in a similar manner as discussed herein in such architectures). For example, the system of the present invention could also enable mobile incentive use via the mobile device 138 itself. In one embodiment, as a participant reviews mobile incentives, rather than visiting a product provider location to use the mobile incentive and obtain the associated product, he could opt to do so from the mobile device 138. Typically, mobile incentives enabled for mobile device use would be associated with online product providers or bricks and mortar product providers with an online presence. For example, a participant could receive a mobile incentive for a 10% discount for a particular DVD from Best Buy. Rather than using the mobile incentive by visiting a Best Buy location, the participant could use the mobile incentive and order the DVD by simply selecting the link on his mobile device 138. Although a participant could provide necessary payment or shipment information via his mobile device 138, if the mobile incentive service enables electronic wallet functionality, this may not be necessary. For example, once the participant has opted to use the mobile incentive and purchase the associated product via his mobile device 138, the mobile controller 158 could receive this signal and prompt the MIMS controller 130 to access the participant's electronic wallet for necessary information, such as financial account data and a shipping address. In one embodiment, a participant could undergo authentication, such as via the processes described in relation to FIG. 8, before his electronic wallet information is retrieved. The electronic wallet server 140 could then retrieve the necessary data from the participant's electronic wallet. The participant could have established a default financial account and shipping address or could indicate the appropriate electronic wallet information via his mobile device 138. For example, the participant could view his registered accounts on the display of his mobile device 138 and select the one desired. The MIMS controller 130 could relay the electronic wallet information to the appropriate product provider server (e.g., as indicated by a product provider identifier included with the mobile incentive). The product provider server can use the financial information to conduct the financial transaction (accounting for any discount associated with the mobile incentive) and use the shipping address to fulfill the participant's order. In one embodiment, if the product provider allows for in-store pickup, and the participant has opted to use it, the participant's shipping address need not be provided.

Terminology used in the foregoing description is for the purpose of describing the particular versions or embodiments only, and is not intended to limit the scope of the present invention which will be limited only by the appended claims. As used herein and in the appended claims, the singular forms "a," "an," and "the" include plural references unless the context clearly dictates otherwise. Similarly, the words "for example", "such as", "include," "includes" and "including" when used herein shall be deemed in each case to be followed by the words "without limitation." Unless defined otherwise herein, all technical and scientific terms used herein have the same meanings as commonly understood by one of ordinary skill in the art. All publications mentioned herein are incorporated by reference. Nothing herein is to be construed as an admission that the embodiments disclosed herein are not entitled to antedate such disclosure by virtue of prior invention. Thus, various modifications, additions and substitutions and the like can be made without departing from the spirit of the invention and these are therefore considered to be within the scope of the invention as defined in the following claims.

What is claimed is:

1. A method for utilizing promotion data accessible via a mobile device, the method comprising:

using a mobile incentive management service comprising a controller and a memory cooperating therewith for receiving one or more first transmissions comprising a digital record of promotion data from one or more product-providers, wherein the controller is remote from a product-provider location, storing, in the memory, the digital record of promotion data supplied by the one or more product providers, aggregating a plurality of digital records of promotion data supplied by the one or more product providers, receiving a second transmission from a mobile device, the second transmission including an electronic request for promotion data, the electronic request including one or more keywords, capturing a device identifier from the mobile device that identifies the mobile device, retrieving one or more personalization criterion associated with the device identifier, selecting a digital record of promotion data, the digital record of promotion data being selected from the plurality of digital records of promotion data supplied by the one or more product providers and being selected based upon the one or more keywords and the one or more personalization criterion associated with the device identifier, associating the digital record of promotion data with an incentive account associated with the device identifier, receiving, from a product-provider point-of-sale system at the product-provider location, one or more third transmissions comprising transaction data associated with a transaction being conducted via the product-provider point-of-sale system, wherein the transaction data includes product information and biometric authentication data identifying the incentive account, receiving one or more fourth transmissions from the controller that comprise an electronic request to apply promotion data associated with the incentive account to the transaction, receiving one or more fifth transmissions from the controller that comprise the biometric authentication data identifying the incentive account, locating, via the biometric authentication data, the incentive account associated with the device identifier and the digital record of promotion data, performing a biometric authentication based upon the biometric data to determine whether the biometric data matches to within a first desired biometric matching threshold associated with the digital record of promotion data, the first desired biometric matching threshold being indicative of a biometric match, determining that the biometric data does not match to within the first desired matching threshold and that the biometric data matches to within a second desired biometric matching threshold indicative of matching at a lesser matching certainty within ten percent of the first desired biometric matching threshold, and based thereon, performing a further non-biometric authentication, determining that the biometric data matches to within one of the first desired biometric matching threshold, and the second desired biometric threshold and upon the further non-biometric authentication, transmitting to the controller, a sixth transmission comprising the digital record of the promotion data, determining whether the promotion data is applicable to the product information included in the transaction data associated with the transaction being conducted via the product-provider point-of-sale system, receiving a seventh transmission comprising a processing result record associated with the use of the digital record of promotion data, and associating usage information derived from the processing result record.

2. The method of claim 1, wherein a personalization criterion is one of time information, a registered individual preference, or location information.

3. The method of claim 1, wherein the associating of a digital record of promotion data with an incentive account is initiated by an individual.

4. The method of claim 1, further comprising relaying usage information to a product provider associated with the promotion data.

5. A method for utilizing promotion data accessible via a mobile device, the method comprising:

using a mobile incentive management service comprising a controller and a memory cooperating therewith for receiving a first transmission from a mobile device, the first transmission including an electronic request for promotion data, wherein the electronic request includes one or more keywords and wherein the controller is remote from a product-provider location, capturing a device identifier identifying the mobile device, retrieving one or more personalization criterion associated with the device identifier, selecting promotion data, the promotion data being selected from an aggregation of data provided by one or more product providers and being selected based upon the one or more keywords and the one or more personalization criterion associated with the device identifier, associating the promotion data with an incentive account associated with the device identifier, wherein the incentive account is identifiable by biometric authentication data, transmitting a second transmission comprising the promotion data to the mobile device identified by the device identifier, receiving, from a product-provider point-of-sale system at the product-provider location, a third transmission comprising transaction data associated with a transaction being conducted via the product-provider point-of sale system, wherein the transaction data includes product information and biometric authentication data identifying the incentive account, receiving a fourth transmission from the controller that comprises the biometric authentication data, using the biometric authentication data to identify the incentive account identifiable by the authentication data and the promotion data associated with the incentive account, performing a biometric authentication based upon the biometric data to determine whether the biometric data matches to within a first desired biometric matching threshold associated with the digital record of promotion data, the first desired biometric matching threshold being indicative of a biometric match, determining that the biometric data does not match to within the first desired matching threshold and that the biometric data matches to within a second desired biometric matching threshold indicative of matching at a lesser matching certainty within ten percent of the first desired biometric matching threshold, and based thereon, performing a further non-biometric authentication, determining that the biometric data matches to within one of the first desired biometric matching threshold, and the second desired biometric threshold and upon the further non-biometric authentication, transmitting a fifth transmission to the controller that comprises the promotion data associated with the incentive account, determining, by the controller, whether the promotion data is applicable to the product information included in the transaction data associated with the transaction being conducted via the product-provider point-of-sale system at the product-provider location, receiving a sixth transmission comprising result data from the controller, wherein the result data indicates which elements of the promotion data were applied during the transaction conducted via the product-provider point-of-sale system at the product-provider location, analyzing the received result data, wherein analyzing comprises determining whether the received result data includes information associated with the transmitted promotion data, and storing data indicative of the presence of information associated with the transmitted promotion data.

6. The method of claim 5, further comprising relaying the data indicative of the presence of information associated with the transmitted promotion data to a product provider associated with the promotion data.

7. A system to facilitate the distribution of promotion data to individuals via mobile devices, the system comprising:

a mobile incentive management service comprising a controller and a memory cooperating therewith, the mobile incentive management service being remote from a product-provider location and configured to:

store product-provider information, store biometric data associated with individuals, relay promotion data to a mobile server, transmit promotion data to the controller, associate promotion data with the individuals based upon an analysis of product-provider information stored by a product provider, store the promotion data associated with the individuals based upon the analysis of product-provider information stored by the product provider, store device information associated with the individuals, and perform a first biometric authentication based upon the biometric data to determine whether the biometric data matches to within a desired biometric matching threshold associated with promotion data, the first desired biometric matching threshold being indicative of a biometric match; and a mobile server configured to receive transmissions from mobile devices, format promotion data per the capabilities of particular mobile devices, and transmit the promotion data to mobile devices;

the mobile incentive management service configured to determine that the biometric data does not match to within the first desired matching threshold and that the biometric data matches to within a second desired biometric matching threshold indicative of matching at a lesser matching certainty within ten percent of the first desired biometric matching threshold, and based thereon, perform a further non-biometric authentication, determining that the biometric data matches to within one of the first desired biometric matching threshold, and the second desired biometric threshold and upon the further non-biometric authentication, determine whether promotion data is applicable to product information included in transaction data associated with transactions being conducted for individuals via a product-provider point-of-sale system at a product provider location, and communicate a processing result record associated with the use of the promotion data.

8. The system of claim 7, wherein the promotion data includes one or more of offer information, a product description, and an advertisement.

9. The system of claim 7, wherein the product provider is a merchant, a manufacturer, or a healthcare provider.

10. The system of claim 7, wherein the mobile incentive management service is further configured to:

store registered verification data of the individuals; and store electronic wallets associated with the individuals.

11. The system of claim 7, wherein the product-provider information includes one or more of location information, client information, transaction information, product taxonomy information, and client segmentation information.

12. The system of claim 7, wherein the mobile incentive management service is further configured to provide the product provider with access to the system.

13. The system of claim 7, wherein the mobile incentive management service is further configured to store promotion data associated with individuals by sources other than the mobile incentive management service.

14. The system of claim 7, wherein the mobile server is further configured to enable the receipt of transmissions via a voice channel, a text message channel, a data channel, or a Wireless Application Protocol channel.

15. The system of claim 7, wherein the mobile server is further configured to enable the relaying of requests for information to the mobile incentive management service.

16. The system of claim 7, wherein the mobile server is further configured to store data indicative of the communication capabilities of particular mobile devices.

* * * * *